(12) United States Patent
Yoshida et al.

(10) Patent No.: US 11,908,177 B2
(45) Date of Patent: Feb. 20, 2024

(54) UPDATED LEARNING OF FEATURE EXTRACTION MODEL THAT EXTRACTS MOVING IMAGE FEATURE AMOUNT FROM MOVING IMAGE DATA AND STILL IMAGE FEATURE AMOUNT FROM STILL IMAGE DATA

(71) Applicant: NEC Corporation, Tokyo (JP)

(72) Inventors: Shuhei Yoshida, Tokyo (JP); Makoto Terao, Tokyo (JP)

(73) Assignee: NEC CORPORATION, Tokyo (JP)

( * ) Notice: Subject to any disclaimer, the term of this patent is extended or adjusted under 35 U.S.C. 154(b) by 95 days.

(21) Appl. No.: 17/608,201

(22) PCT Filed: May 29, 2019

(86) PCT No.: PCT/JP2019/021240
§ 371 (c)(1),
(2) Date: Nov. 2, 2021

(87) PCT Pub. No.: WO2020/240727
PCT Pub. Date: Dec. 3, 2020

(65) Prior Publication Data
US 2022/0198783 A1    Jun. 23, 2022

(51) Int. Cl.
*G06V 10/776* (2022.01)
*G06V 10/774* (2022.01)
(Continued)

(52) U.S. Cl.
CPC .............. *G06V 10/776* (2022.01); *G06T 7/20* (2013.01); *G06V 10/62* (2022.01);
(Continued)

(58) Field of Classification Search
CPC .. G06V 10/776; G06V 10/62; G06V 10/7747; G06V 20/46; G06V 10/454;
(Continued)

(56) References Cited

U.S. PATENT DOCUMENTS

2009/0316962 A1\* 12/2009 Sun ..................... G06V 40/172
                                                             382/118
2015/0087903 A1\* 3/2015 Kuramoto .............. A61B 1/045
                                                             600/109

(Continued)

FOREIGN PATENT DOCUMENTS

JP      2017-111660 A     6/2017
JP      2017111660   \*   6/2017  ............... G06T 7/00
WO     2018/083984 A     5/2018

OTHER PUBLICATIONS

International Search Report for PCT Application No. PCT/JP2019/021240, dated Jul. 16, 2019.

(Continued)

*Primary Examiner* — Amara Abdi

(57) ABSTRACT

The learning device 10D is learned to extract moving image feature amount Fm which is feature amount relating to the moving image data Dm when the moving image data Dm is inputted thereto, and is learned to extract still image feature amount Fs which is feature amount relating to the still image data Ds when the still image data Ds is inputted thereto. The first inference unit 32D performs a first inference regarding the moving image data Dm based on the moving image feature amount Fm. The second inference unit 34D performs a second inference regarding the still image data Ds based on the still image feature amount Fs. The learning unit 36D performs learning of the feature extraction unit 31D based on the results of the first inference and the second inference.

10 Claims, 14 Drawing Sheets

(51) Int. Cl.
*G06V 20/40* (2022.01)
*G06V 10/62* (2022.01)
*G06T 7/20* (2017.01)

(52) U.S. Cl.
CPC .......... *G06V 10/7747* (2022.01); *G06V 20/46* (2022.01); *G06T 2207/10016* (2013.01); *G06T 2207/20081* (2013.01); *G06T 2207/20084* (2013.01)

(58) Field of Classification Search
CPC ........ G06V 10/806; G06V 40/20; G06T 7/20; G06T 2207/10016; G06T 2207/20081; G06T 2207/20084
See application file for complete search history.

(56) References Cited

U.S. PATENT DOCUMENTS

| | | | |
|---|---|---|---|
| 2017/0206437 A1* | 7/2017 | Hachiya | G06F 18/2148 |
| 2018/0288131 A1* | 10/2018 | Schmitt | G06Q 10/063 |
| 2018/0357078 A1* | 12/2018 | Ando | G06N 3/08 |
| 2019/0018083 A1* | 1/2019 | Fujiwara | G01R 33/0029 |
| 2021/0287373 A1* | 9/2021 | Murata | H04N 1/00167 |

OTHER PUBLICATIONS

J. Carreira, A. Zisserman, "Quo vadis, action recognition? a new model and the kineticsdataset," in proceedings of the IEEE Conference on Computer Vision and Pattern Recognition, 2017, pp. 6299-6308.

Du Tran, Lubomir Bourdev, Rob Fergus, Lorenzo Torresani, Manohar Paluri, "Learning Spatiotemporal Features with 3D Convolutional Networks", ICCV2015, 2015, pp. 4489-4497.

* cited by examiner

UPDATED LEARNING OF FEATURE EXTRACTION MODEL THAT EXTRACTS MOVING IMAGE FEATURE AMOUNT FROM MOVING IMAGE DATA AND STILL IMAGE FEATURE AMOUNT FROM STILL IMAGE DATA

This application is a National Stage Entry of PCT/JP2019/021240 filed on May 29, 2019, the contents of all of which are incorporated herein by reference, in their entirety.

TECHNICAL FIELD

The present invention relates to a technical field of a learning device, an inference device, a control method, and a storage medium related to learning of feature extraction for moving image data.

BACKGROUND ART

As a method of recognition processing for moving image (video) data, a moving image recognition method using a three-dimensional convolutional neural network is disclosed in Non-Patent Literature 1. Further, Non-Patent Literature 2 discloses a technique for executing learning of a feature extraction unit and a moving image recognition unit in a learning model, whose input data is moving image data, based on a moving image recognition loss calculated from the result of the moving image recognition, wherein the feature extraction unit and the moving image recognition unit are three-dimensional convolutional neural networks, respectively.

PRIOR ART DOCUMENTS

Patent Literature

Non-Patent Literature 1: J. Carreira, A. Zisserman, "Quo vadis, action recognition? a new model and the kinetics-dataset," in proceedings of the IEEE Conference on Computer Vision and Pattern Recognition, 2017, pp. 6299-6308.

Non-Patent Literature 2: Du Tran, Lubomir Bourdev, Rob Fergus, Lorenzo Torresani, Manohar Paluri, "Learning Spatiotemporal Features with 3D Convolutional Networks" ICCV2015, 2015, pp. 4489-4497.

SUMMARY OF THE INVENTION

Problems to be Solved by the Invention

Generally, if training data is insufficient, the correlation which is not related to the recognition will be learned from the training data, and the recognition accuracy will not become sufficient accuracy. On the other hand, the burden on the generation of the moving image data and the correct answer data that are training data is generally large. Thus, it may be difficult to prepare sufficient training data for learning in the moving image recognition. In the method according to Non-Patent Literature 1 and Non-Patent Literature 2, it is assumed that moving image data annotated with correct answer data for learning can be sufficiently prepared and Non-Patent Literature 1 and Non-Patent Literature 2 are silent on any effective learning method when the amount of the annotated moving image data for learning is limited.

In view of the above-described issues, it is therefore an example object of the present disclosure to provide a learning device, an inference device, a control method, and a storage medium capable of suitably executing learning of moving image recognition.

Means for Solving the Problem

In one mode of the learning device, there is provided a learning device including: a feature extraction unit configured to be learned to extract moving image feature amount which is feature amount relating to moving image data when the moving image data is inputted thereto, and to extract still image feature amount which is feature amount relating to still image data when the still image data is inputted thereto; a first inference unit configured to perform a first inference regarding the moving image data based on the moving image feature amount; a second inference unit configured to perform a second inference regarding the still image data based on the still image feature amount; and a learning unit configured to perform learning of the feature extraction unit based on results of the first inference and the second inference.

In one mode of the control method, there is provided a control method executed by a learning device, the control method including: performing extraction of moving image feature amount which is feature amount relating to moving image data when the moving image data is inputted, and extraction of still image feature amount which is feature amount relating to still image data when the still image data is inputted; performing a first inference regarding the moving image data based on the moving image feature amount; performing a second inference regarding the still image data based on the still image feature amount; and performing learning of process of the extraction of the moving image feature amount and the extraction of the moving image feature amount based on results of the first inference and the second inference.

In one mode of the storage medium, there is provided a storage medium storing a program executed by a computer, the program causing the computer to function as: a feature extraction unit configured to be learned to extract moving image feature amount which is feature amount relating to moving image data when the moving image data is inputted thereto, and to extract still image feature amount which is feature amount relating to still image data when the still image data is inputted thereto; a first inference unit configured to perform a first inference regarding the moving image data based on the moving image feature amount; a second inference unit configured to perform a second inference regarding the still image data based on the still image feature amount; and a learning unit configured to perform learning of the feature extraction unit based on results of the first inference and the second inference.

Effect of the Invention

An example advantage according to the present invention is to suitably learn a feature extraction unit that extracts the feature amount effective for the moving image recognition by performing the learning of the feature extraction unit using still image data in addition to the moving image data.

DESCRIPTION OF EXAMPLE EMBODIMENTS

Hereinafter, an example embodiment of a learning device, an inference device, a control method, and a storage medium will be described with reference to the drawings.

First Example Embodiment (1) Overall Configuration

Figure 1:
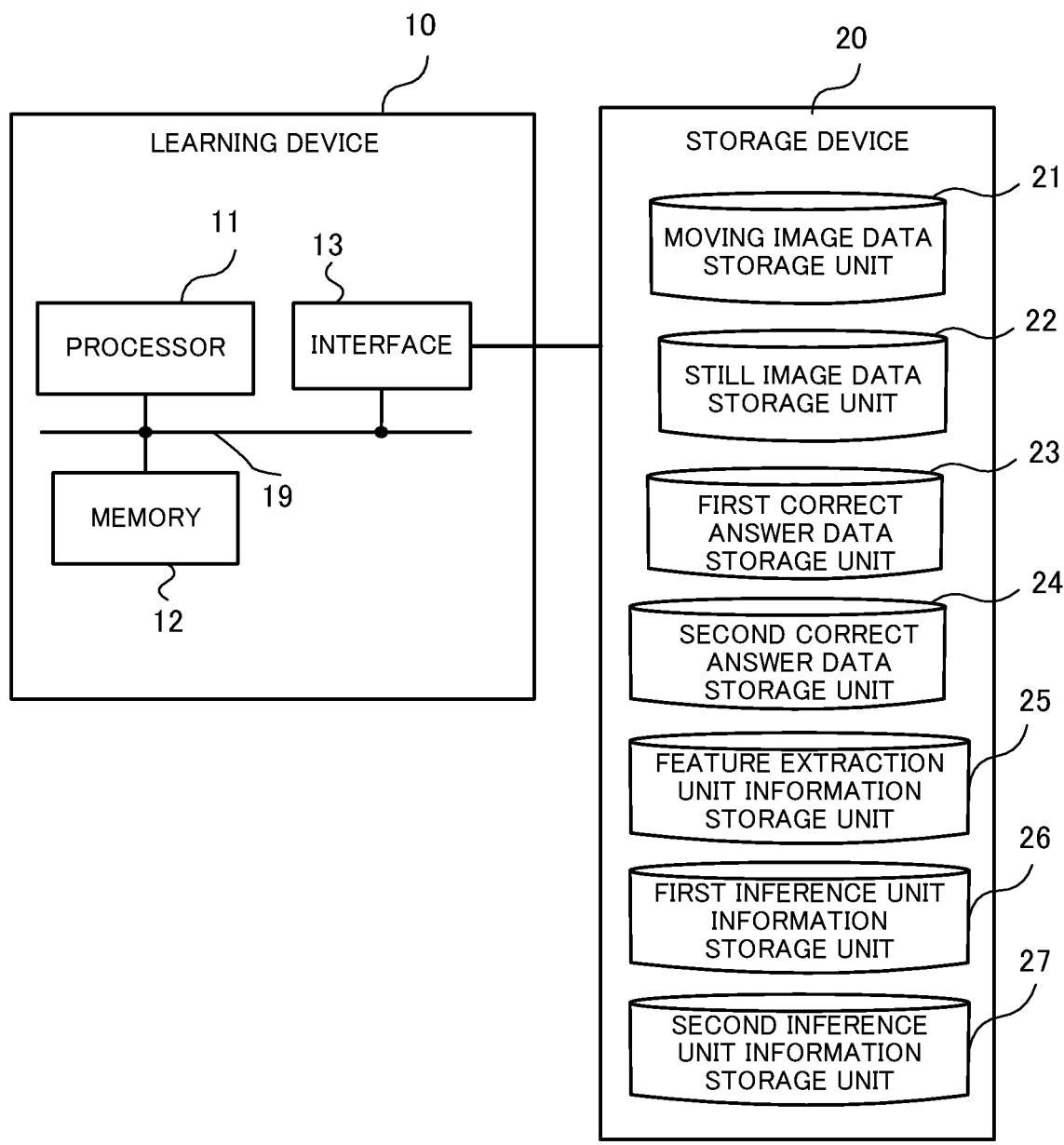
FIG. 1 illustrates a schematic configuration of a learning system.

FIG. 1 shows a schematic configuration of a learning system 100 according to an example embodiment. The learning system 100 suitably executes the learning of a learning model for performing inference (recognition) regarding moving image data. The learning system 100 includes a learning device 10 and a storage device 20.

The learning device 10 performs learning of a learning model regarding an inference from moving image data. Here, the learning model may be a learning model based on a neural network or may be another kind of learning model such as a support vector machine or may be a combined learning model with them. Examples of inference from moving image data include the detection of a person who performs a specific action such as suspicious action, the identification of the motion that the person is performing, and the prediction of the accident.

The storage device 20 includes a moving image data storage unit 21, a still image data storage unit 22, a first correct answer data storage unit 23, a second correct answer data storage unit 24, a feature extraction unit information storage unit 25, a first inference unit information storage unit 26, and a second inference unit information storage unit 27. The storage device 20 may be an external storage device such as a hard disk connected to or built in to the learning device 10, or may be a storage medium such as a flash memory, or may be a server device that performs data communication with the learning device 10. Further, the storage device 20 may include a plurality of storage devices to separately hold the storage units described above The moving image data storage unit 21 stores moving image data which is the training data to be used for learning of the learning model. Each moving image data stored in the moving image data storage unit 21 is associated with correct answer data stored in the first correct answer data storage unit 23 described later. The still image data storage unit 22 stores still image data which is the training data to be used for learning of the learning model. Each still image data stored in the still image data storage unit 22 is associated with the correct answer data stored in the second correct answer data storage unit 24 to be described later. It is noted that each of the still image data and image data per frame of the moving image data is data having a value in a three-dimensional space defined by the vertical and horizontal directions of the image and the channel direction. It is also noted that in the case of RGB image data, there are at least provided channels corresponding to R, G, and B colors in the channel direction, and in the case of an image in which the distance information is included for each pixel, there are at least provided channels corresponding to the distance information.

The first correct answer data storage unit 23 stores correct answer data for the moving image data stored in the moving image data storage unit 21. In this case, the correct answer data is data indicating a result to be inferred when target moving image data is inputted, and is associated with the target moving image data stored in the moving image data storage unit 21. Instead of having the first correct answer data storage unit 23, the storage device 20 may store in the moving image data storage unit 21 the moving image data to which the corresponding correct answer data is added.

The second correct answer data storage unit 24 stores correct answer data for the still image data stored in the still image data storage unit 22. In this case, the correct answer data is data indicating a result to be inferred when target still image data is inputted, and is associated with the target still image data stored in the still image data storage unit 22. Instead of having the second correct answer data storage unit 24, the storage device 20 may store, in the still image data storage unit 22, the still image data to which the corresponding correct answer data is added.

The feature extraction unit information storage unit 25 stores information relating to parameters necessary to configure the feature extraction unit (the feature extraction unit 31 in FIG. 2) to be described later. The first inference unit information storage unit 26 stores information relating to parameters necessary to configure the first inference unit (first inference unit 32 in FIG. 2) to be described later. The second inference unit information storage unit 27 stores information relating to parameters necessary to configure the second inference unit (second inference unit 34 in FIG. 2) to be described later.

Next, the hardware configuration of the learning device 10 will be described with reference to FIG. 1.

The learning device 10 includes, as hardware, a processor 11, a memory 12, and an interface 13. The processor 11, the memory 12, and the interface 13 are connected to one another via a data bus 19.

The processor 11 executes a predetermined process by executing a program stored in the memory 12. The processor 11 is a processor such as a CPU (Central Processing Unit) and a GPU (Graphics Processing Unit).

The memory 12 is configured by various memories such as a RAM (Random Access Memory), a ROM (Read Only Memory), and a flash memory. The memory 12 stores a program for executing a process relating to learning executed by the learning device 10. The memory 12 is used as a work memory and temporarily stores information acquired from the storage device 20. The memory 12 may function as a part of the storage device 20 or the storage device 20. In this case, the memory 12 may store at least one of the moving image data storage unit 21, the still image data storage unit 22, the first correct answer data storage unit 23, the second correct answer data storage unit 24, the feature extraction unit information storage unit 25, the first inference unit information storage unit 26, and the second inference unit information storage unit 27 instead of the storage device 20 storing all of them. Similarly, the storage device 20 may function as a memory 12 of the learning device 10.

The interface 13 is a communication interface for wired or wireless transmission and reception of data to and from the storage device 20 under the control of the processor 11, and includes a network adapter and the like. The learning device 10 and the storage device 20 may be connected to each other through a cable or the like. In this case, examples of the interface 13 include not only a communication interface for performing data communication with the storage device 20 but also an interface that conforms to a USB, a SATA (Serial AT Attachment), and the like for exchanging data with the storage device 20.

The hardware configuration of the learning device 10 is not limited to the configuration shown in FIG. 1. For example, the learning device 10 may further include a display unit such as a display, an input unit such as a keyboard or a mouse, a sound output unit such as a speaker, and the like.

Further, the learning device 10 may be configured by a plurality of devices. In this case, each of these devices transmits and receives information necessary for each device to perform a predetermined processing allocated among the devices.

(2) Functional Block

Next, a functional configuration of the learning device 10 will be described.

(2-1) Overview

Figure 2:
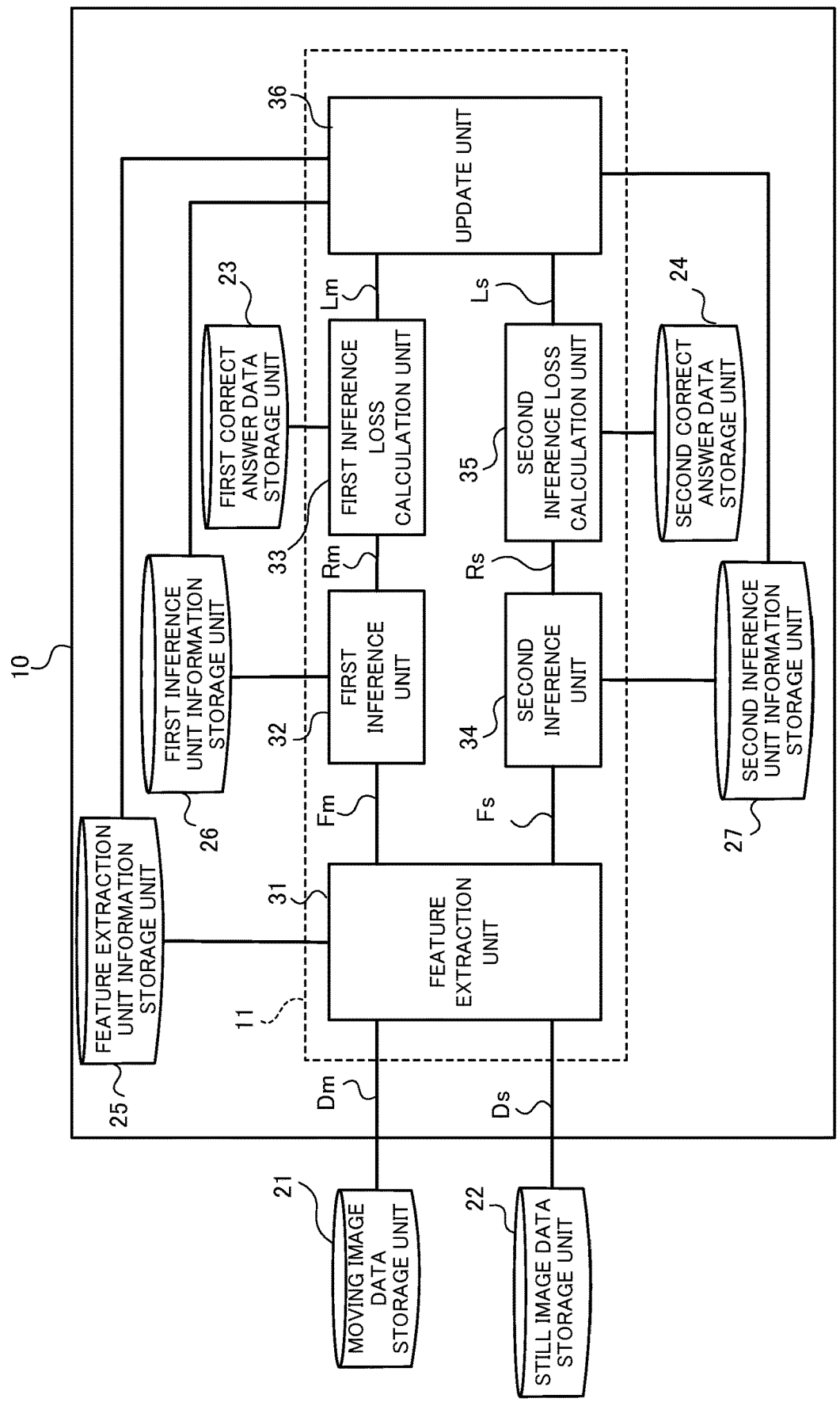
FIG. 2 schematically illustrates a functional configuration of a learning device according to a first example embodiment.

FIG. 2 is a schematic diagram illustrating a functional configuration of the learning device 10. As shown in FIG. 2, the processor 11 of the learning device 10 includes a feature extraction unit 31, a first inference unit 32, a first inference loss calculation unit 33, a second inference unit 34, a second inference loss calculation unit 35, and an update unit 36.

The feature extraction unit 31 executes the feature extraction process for both the moving image data stored in the moving image data storage unit 21 and the still image data stored in the still image data storage unit 22. Specifically, when the moving image data "Dm" is inputted to the feature extraction unit 31 from the moving image data storage unit 21, the feature extraction unit 31 extracts the moving image feature amount "Fm" which is a feature amount relating to the moving image data Dm from the moving image data Dm.

In addition, when the still image data "Ds" is inputted to the feature extraction unit 31 from the still image data storage unit 22, the feature extraction unit 31 extracts the still image feature amount "Fs" which is a feature amount relating to the still image data Ds from the still image data Ds.

Here, the feature extraction unit 31 is a learning model that is learned so as to extract the moving image feature amount Fm from the inputted moving image data Dm and extract the still image feature amount Fs from the inputted still image data Ds. Further, the feature extraction unit 31 has a common parameter to perform the extraction of the moving image feature amount Fm and the extraction of the still image feature amount Fs. Then, the parameter is suitably updated at both of the learning process using the moving image data Dm and the learning process using the still image data Ds. The feature extraction unit 31 is configured by, for example, learning a learning model such as a convolutional neural network. It is noted that the feature extraction unit 31 is not limited to a learning model based on a neural network, and may function based on other types of learning models such as a support vector machine. A specific configuration example of the feature extraction unit 31 will be described later.

The feature extraction unit information storage unit 25 stores information relating to parameters necessary for causing the feature extraction unit 31 to function. For example, when the feature extraction unit 31 has a configuration based on the neural network, the feature extraction unit information storage unit 25 includes information relating to various parameters such as the layer structure of the feature extraction unit 31, the neuron structure of each layer, the number of filters and the filter size in each layer, and the weight of each element of each filter.

The first inference unit 32 performs inference (also referred to as "first inference") relating to a motion (action) or an event or the like on the basis of the moving image feature amount Fm supplied from the feature extraction unit 31, and outputs a first inference result "Rm" which is a result of the first inference. For example, the first inference unit 32 outputs, as the first inference result Rm, information indicating the probability that each motion or event or the like to be detected or identified by the first inference has occurred. Here, the first inference unit 32 is a learning model that is learned to output the first inference result Rm on the basis of the moving image feature amount Fm supplied from the feature extraction unit 31. The first inference unit 32 may employ a learning model based on a neural network such as a convolutional neural network, or may employ other types of learning models such as a support vector machine. The first inference unit information storage unit 26 stores information relating to parameters necessary for causing the first inference unit 32 to function.

The first inference loss calculation unit 33 calculates a first inference loss "Lm", that is a loss for the first inference by the first inference unit 32, based on the first inference result Rm and the correct answer data which corresponds to the moving image data Dm and which is obtained from the first correct answer data storage unit 23. The loss function used for calculating the first inference loss Lm may be any loss function used in machine learning such as cross entropy and mean square error. Then, the first inference loss calculation unit 33 supplies the calculated first inference loss Lm to the update unit 36.

The second inference unit 34 performs inference (also referred to as "second inference") relating to identification of an object or the like, based on the still image feature amount Fs supplied from the feature extraction unit 31, and outputs a second inference result "Rs" which is a result of the second inference. For example, the second inference unit 34 outputs, as the second inference result Rs, information indicating the probability that an object or an event to be recognized by the second inference exists or has occurred. Here, the second inference unit 34 is a learning model that is learned to output the second inference result Rs on the basis of the still image feature amount Fs supplied from the feature extraction unit 31. Here, the second inference unit 34 may employ a learning model based on a neural network such as a convolutional neural network, or may employ other types of learning models such as a support vector machine. The second inference unit information storage unit 27 stores information relating to parameters necessary for causing the second inference unit 34 to function.

The second inference loss calculation unit 35 calculates a second inference loss "Ls", that is a loss for the second inference by the second inference unit 34, based on the second inference result Rs and the correct answer data which corresponds to the still image data Ds and which is obtained from the second correct answer data storage unit 24. The loss function used for the second inference loss Ls may be any loss function used in machine learning. Then, the second inference loss calculation unit 35 supplies the calculated second inference loss Ls to the update unit 36.

The update unit 36 updates parameters of the feature extraction unit 31, the first inference unit 32, and the second inference unit 34 based on the first inference loss Lm supplied from the first inference loss calculation unit 33 and the second inference loss Ls supplied from the second inference loss calculation unit 35, respectively. In other words, the update unit 36 changes the parameters of the feature extraction unit 31, the first inference unit 32, and the second inference unit 34 so that the first inference loss Lm and the second inference loss Ls decrease, and stores the parameters of each of the units after the change in the feature extraction unit information storage unit 25, the first inference unit information storage unit 26, and the second inference unit information storage unit 27, respectively.

In this case, in the first example, the update unit 36 determines the parameters of the feature extraction unit 31, the first inference unit 32, and the second inference unit 34 so that the sum of the first inference loss Lm and the second inference loss Ls is minimized. In the second example, the update unit 36 independently executes the processing of determining the parameters of the feature extraction unit 31 and the first inference unit 32 so that the first inference loss Lm is minimized, and the processing of determining the parameters of the feature extraction unit 31 and the second inference unit 34 so that the second inference loss Ls is minimized. In the second example, the update unit 36 may perform the processing of determining the parameters of the feature extraction unit 31 and the first inference unit 32 so that the first inference loss Lm is minimized prior to or after the processing of determining the parameters of the feature extraction unit 31 and the second inference unit 34 so that the second inference loss Ls is minimized. The algorithm for determining each parameter so as to minimize the first inference loss Lm and the second inference loss Ls according to the first example or the second example may be any learning algorithm used in machine learning such as a gradient descent method or an error back propagation method.

(2-2) Configuration of Feature Extraction Unit

Next, a configuration of the feature extraction unit 31 will be specifically described.

Figure 3:
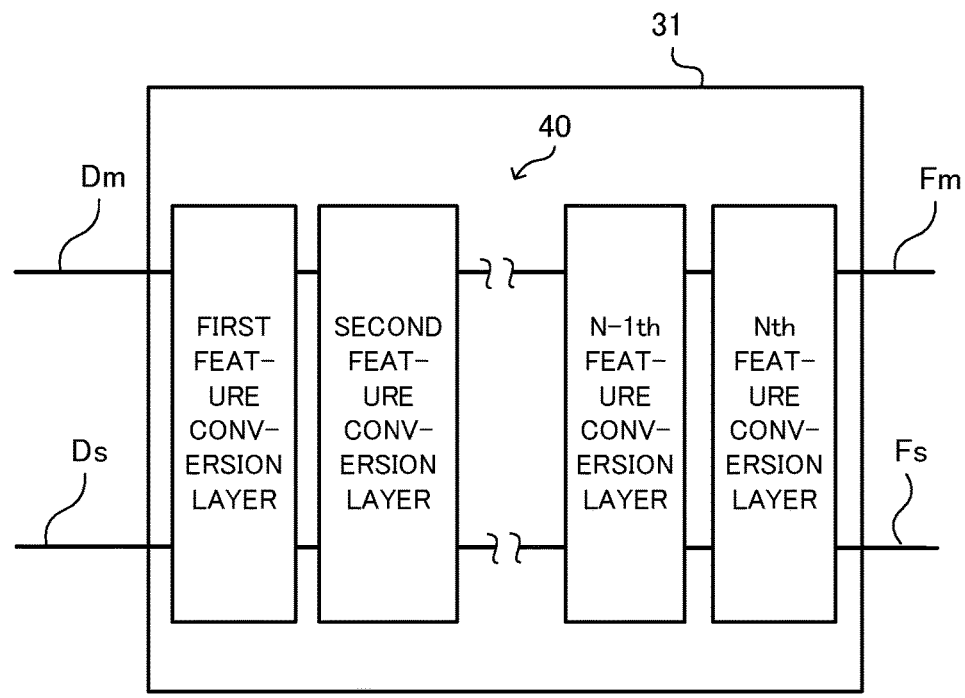
FIG. 3 illustrates a block diagram of a feature extraction unit.

FIG. 3 shows a block configuration diagram of a feature extraction unit 31. As shown in FIG. 3, the feature extraction unit 31 includes one or more feature converting layers 40. In FIG. 3, the feature extraction unit 31 includes N (N is an integer) feature conversion layers 40 (the first to the $N_{th}$ feature converting layers) as components.

When the moving image data Dm and the still image data Ds are inputted to the first feature conversion layer, the first feature conversion layer performs respective feature conversion so that the feature amount per (for each) frame or image is represented in the same feature space, and supplies the respective feature amount of the moving image data Dm and the still image data Ds after the feature conversion to the second feature conversion layer. The second to $N-1_{th}$ feature conversion layers convert the respective feature amount corresponding to the moving image data Dm and the still image data Ds supplied from the feature conversion layer provided in the preceding stage so as to be represented in the same feature space per image (frame), and supply the respective feature amount of the moving image data Dm and the still image data Ds after the feature conversion to the feature conversion layer provided in the following stage. Then, the $N_{th}$ feature conversion layer performs feature conversion for the respective feature amount corresponding to the moving image data Dm and the still image data Ds supplied from the $N-1_{th}$ feature conversion layer, and outputs the moving image feature amount Fm and the still image feature amount Fs which are the feature amount after the feature conversion.

Although the configuration example in which the feature extraction unit 31 includes the plurality of feature converting layers 40 has been exemplified in FIG. 3, the feature extraction unit 31 may include at least one feature converting layer 40.

Next, specific examples (the first to third configuration examples) of the configuration of the feature conversion layer 40 will be described. Each feature conversion layer 40 may have all the same configuration or the configuration may be different depending on each feature conversion layer 40.

Figure 4:
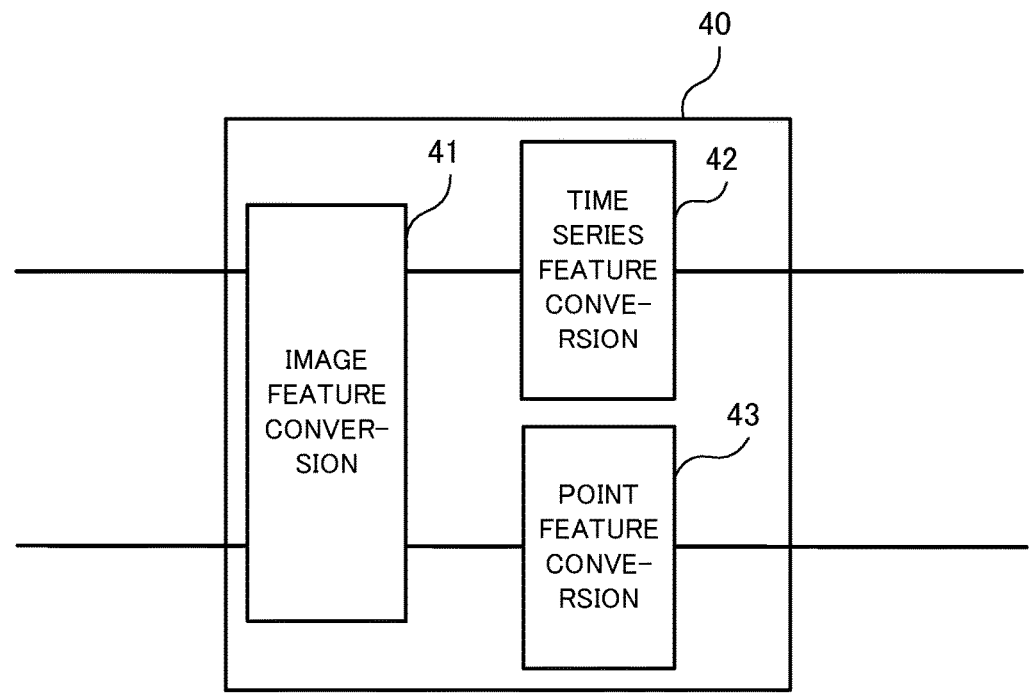
FIG. 4 illustrates a first configuration example of a feature conversion layer.

FIG. 4 shows a first configuration example of a feature conversion layer 40. The feature conversion layer 40 according to the first configuration example shown in FIG. 4 includes an image feature conversion block 41, a time series feature conversion block 42, and a point feature conversion block 43.

The image feature conversion block 41 performs feature conversion, with respect to each image (that is, in the spatial direction), of the moving image data Dm, the still image data Ds, or these feature amount inputted to the image feature conversion block 41. Specifically, when the moving image data Dm or the feature amount of the moving image data Dm is inputted thereto, the image feature conversion block 41 performs the feature conversion, per image (per frame), of the moving image data Dm or the feature amount of the moving image data Dm. Further, the image feature conversion block 41 also performs the feature conversion of the still image data Ds or the feature amount of the still image data Ds when the still image data Ds or the feature amount of the still image data Ds is inputted thereto. The image feature conversion block 41 is configured by, for example, a two-dimensional convolutional neural network that is learned to perform feature conversion per image.

Here, a supplementary description will be given of the variation in the feature space due to the feature conversion by the image feature conversion block 41. Thereafter, the four-dimensional space, in which the moving image data Dm or the feature amount thereof to be inputted to the image feature conversion block 41 is represented, is expressed as "H×W×C×T" according to the data length of each dimension. Here, "H" indicates the data length (i.e., image size) in the longitudinal direction of the image, "W" indicates the data length in the lateral direction of the image, "C" indicates the data length (i.e., the number of channels) in the channel direction, and "T" indicates the data length (i.e., the number of frames) in the time direction.

In this case, the image feature conversion block 41 converts the moving image data Dm or the feature amount thereof in the space "H×W×C×T" into the feature amount in the space "H1×W1×C1×T". Here, "H1" indicates the data length in the longitudinal direction of the image after the feature conversion by the image feature conversion block 41, "W1" indicates the data length in the lateral direction of the image after the feature conversion by the image feature conversion block 41, and "C1" indicates the data length (i.e., the number of channels) in the channel direction of the image after the feature conversion by the image feature conversion block 41. As described above, the image feature conversion block 41 performs the feature conversion, in each direction excluding the time direction, of the moving image data Dm or the feature amount thereof inputted to the image feature conversion block 41 or the feature amount thereof.

Similarly, when the three-dimensional space, in which each image data of the moving image data Dm or the still image data Ds or the feature amount thereof is represented, is expressed as "H×W×C", the image feature conversion block 41 converts the still image data Ds or the feature amount thereof in the space "H×W×C" into the feature amount in the space "H1×W1×C1".

As described above, the image feature conversion block 41 executes the feature conversion, in each direction excluding the time direction, of the inputted moving image data Dm and the inputted still image data Ds.

The time series feature conversion block 42 performs feature conversion, in the time direction, of the feature amount of the moving image data Dm inputted from the image feature conversion block 41. The image feature conversion block 41 is configured by, for example, a one-dimensional convolutional neural network that is learned to perform feature conversion in the time direction.

Specifically, the time series feature conversion block 42 converts the feature amount of the moving image data Dm in the space "H1×W1×C1×T" supplied from the image feature conversion block 41 into the feature amount in the space "H1×W1×C2×T1". Here, "C2" indicates the data length (the number of channels) in the channel direction after the feature conversion by the time series feature conversion block 42, and "T1" indicates the data length (the number of frames) in the time direction after the feature conversion by the time series feature conversion block 42. Thus, the time series feature conversion block 42 performs feature conversion, in the time direction and the channel direction, of the feature amount of the moving image data Dm inputted to the image feature conversion block 41.

The point conversion block 43 performs point feature conversion of the feature amount of the still image data Ds inputted from the image feature conversion block 41. The image feature conversion block 41 is configured by, for example, a 0-dimensional convolutional neural network that is learned to perform feature conversion in the channel direction of each pixel.

Specifically, the point feature conversion block 43 converts the feature amount of the still image data Ds in the space "H1×W1×C1" supplied from the image feature conversion block 41 into the feature amount in the space "H1×W1×C2". Here, the channel number C2 of the feature amount of the still image data Ds after feature conversion by the point feature conversion block 43 is equal to the channel number C2 of the feature amount of the moving image data Dm after feature conversion by the time series feature conversion block 42. Thus, the point feature conversion block 43 converts the feature amount of the still image data Ds so as to be represented in the same feature space as the feature amount of the moving image data Dm per image (frame) after the feature conversion by the time series feature conversion block 42. In other words, the point feature conversion block 43 converts the feature amount of the still image data Ds so that the data length (i.e., the same number of channels) in the channel direction of the feature amount of the still image data Ds is equal to the data length in the channel direction of the feature amount of the moving image data Dm per image (frame) converted by the time-series feature conversion block 42. Thereby, the feature amount outputted from the time series feature conversion block 42 and the feature amount outputted from the point feature conversion block 43 are inputted as feature amount with the same (common) format to the image feature conversion block 41 of the feature conversion layer 40 in the subsequent stage. Thus, the feature conversion is preferably performed by the image feature conversion block 41. Therefore, the feature conversion layer 40 can perform the feature conversion for the moving image data Dm and the still image data Ds by the common image feature conversion block 41.

The configuration of the image feature conversion block 41 is not limited to the configuration according to the convolution neural network, and may be the configuration according to any other learning model that is learned to perform feature conversion per image (frame). Similarly, the configuration of the time series feature conversion block 42 is not limited to the configuration according to a convolutional neural network and may be the configuration according to any other learning model that is learned to perform feature transformations in the time direction and in the channel direction. Similarly, the configuration of the point feature extraction block 43 is not limited to the configuration according to a convolutional neural network and may be the configuration according to any other learning model that is learned to perform feature conversion in the channel direction.

Here, a supplementary description will be given of the effect according to the first configuration example.

Generally, when the feature extraction unit 31 is configured by a convolutional neural network or the like, since the convolutional neural network has a large number of parameters, a large amount of moving image data Dm with which the correct answer data is associated is required in order to learn these parameters. In general, if the training data is insufficient, the correlation unrelated to the recognition included in the training data will be learned, and the recognition accuracy will not be sufficient.

In view of the above, the feature conversion layer 40 according to the first configuration example includes the image feature conversion block 41 that executes the feature conversion regarding the moving image data Dm and the feature conversion regarding the still image data Ds in common. In this case, both at the learning process using the moving image data Dm and at the learning process using the still image data Ds, the parameters are suitably learned (updated). Therefore, even if the amount of the moving image data Dm and the correct answer data is insufficient for learning to achieve sufficient recognition accuracy, the learning device 10 can perform learning of the image feature conversion block 41 through learning by use of the still image data Ds and acquire the parameters of the image feature conversion block 41 with a high degree of accuracy.

Figure 5A:
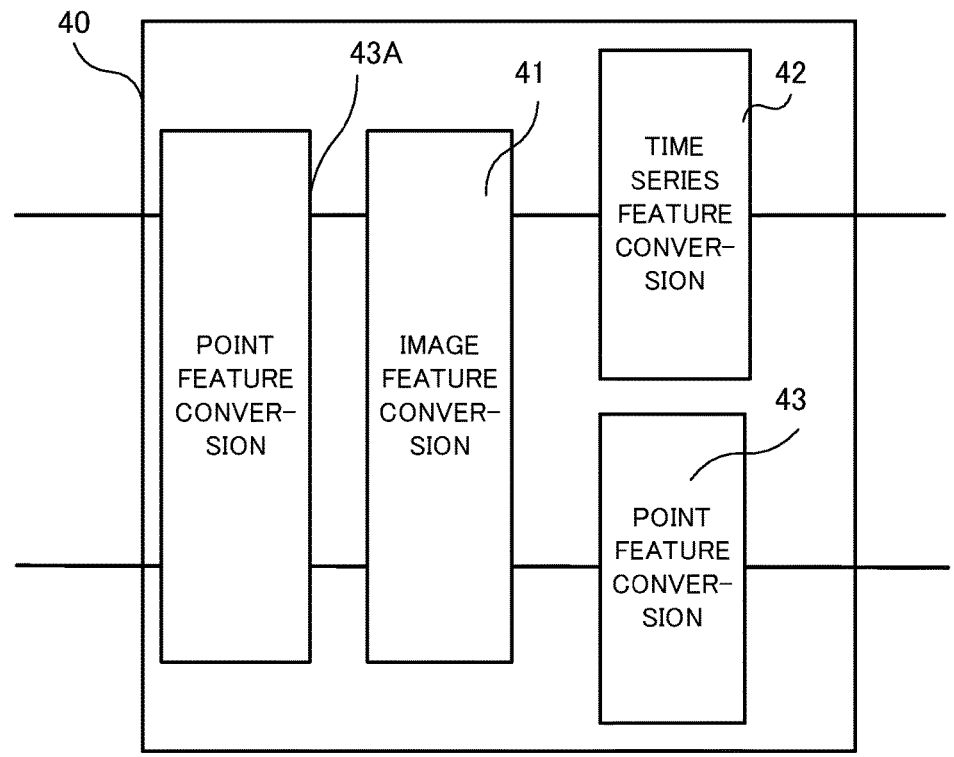
FIG. 5A illustrates a second configuration example of the feature conversion layer.

FIG. 5A shows a second configuration example of the feature conversion layer 40. The feature conversion layer 40 according to the second configuration example shown in FIG. 5A differs from the feature conversion layer 40 according to the first configuration example in that the point feature conversion block 43A is provided in the preceding stage of the image feature conversion block 41.

The point feature conversion block 43A performs point feature conversion of the moving image data Dm, the still image data Ds, or the feature amount thereof which are inputted thereto. The image feature conversion block 41 is configured by, for example, a 0-dimensional convolutional neural network that is learned to perform feature conversion in the channel direction of each pixel.

In this case, the point feature conversion block 43A performs feature conversion, in the channel direction, of the inputted moving image data Dm or the feature amount thereof and the still image data Ds or the feature amount thereof. Then, the point feature conversion block 43A supplies the feature amount after the feature conversion to the image feature transformation block 41. In this case, with respect to each of the longitudinal direction, the lateral direction, and channel direction, the data length of the image indicative of the feature amount per image (frame) of the moving image data Dm inputted to the image feature conversion block 41 is equal to the data length of the image indicated by the still image data Ds inputted to the image feature conversion block 41. Therefore, in the same way as the feature conversion layer 40 according to the first configuration example, the feature conversion layer 40 according to the second configuration example can input feature amount of the moving image data Dm and the still image data Ds in the same format to the image feature conversion block 41. Therefore, the feature conversion layer 40 according to the second configuration example can suitably perform the feature conversion of the moving image data Dm or the still image data Ds by the common image feature conversion block 41.

Figure 5B:
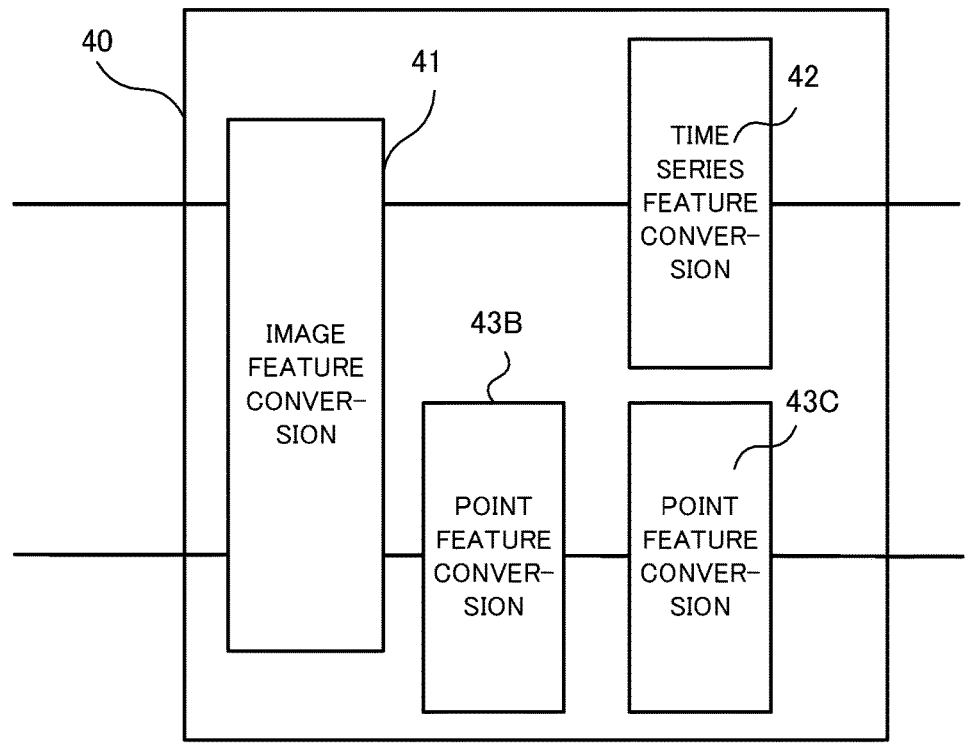
FIG. 5B illustrates a third configuration example of the feature conversion layer.

FIG. 5B shows a third configuration example of the feature conversion layer 40. The feature conversion layer 40 according to the third configuration example shown in FIG. 5B differs from the feature conversion layer 40 according to the first configuration example in that it includes two point feature conversion blocks 43B and 43C instead of the feature conversion block 43.

Here, the point feature conversion block 43B and the point feature conversion block 43C each performs the point feature conversion of the inputted feature amount of the still image data Ds. Here, it is assumed that the time series feature conversion block 42 converts the feature amount of the moving image data Dm in the form of "H1×W1×C1×T" into the feature amount in the form of "H1×W1×C2×T1", and the image feature conversion block 41 inputs the feature amount of the still image data Ds in the form of "H1×W1×C1" to the point conversion block 43B. In this case, the point feature conversion block 43B converts the feature amount of the still image data Ds in the form of "H1×W1×C1" into the feature amount in the form of "H1×W1×C1α", and the point feature conversion block 43C converts the feature amount in the form of "H1×W1×C1α" inputted from the point feature conversion block 43B into the feature amount in the form of "H1×W1×C2". Here, "C1α" indicates the data length (number of channels) in the channel direction after the feature conversion by the point feature conversion block 43B. In this case, the number of channels C2 of the feature amount of the still image data Ds after the feature conversion by the point feature conversion block 43C is the same as the number of channels C2 of the feature amount of the moving image data Dm after the feature conversion by the time series feature conversion block 42.

Thus, the point feature conversion block 43B and the point feature conversion block 43C according to the third configuration example convert the feature amount of the still image data Ds so as to be in the same format as the feature amount per image (frame) of the moving image data Dm that is feature-converted by the time series feature conversion block 42. Thus, according to the third configuration example, in the same way as the first and second configuration examples, the feature conversion layer 40 can perform the feature conversion of both the moving image data Dm and the still image data Ds through the common image feature conversion block 41.

As described above, the feature extraction unit 31 has a layer structure including at least one or more feature converting layers 40 that are layers having an image feature converting block 41, a time series feature converting block 42, and a point feature converting block 43.

(3) Processing Flow

Figure 6:
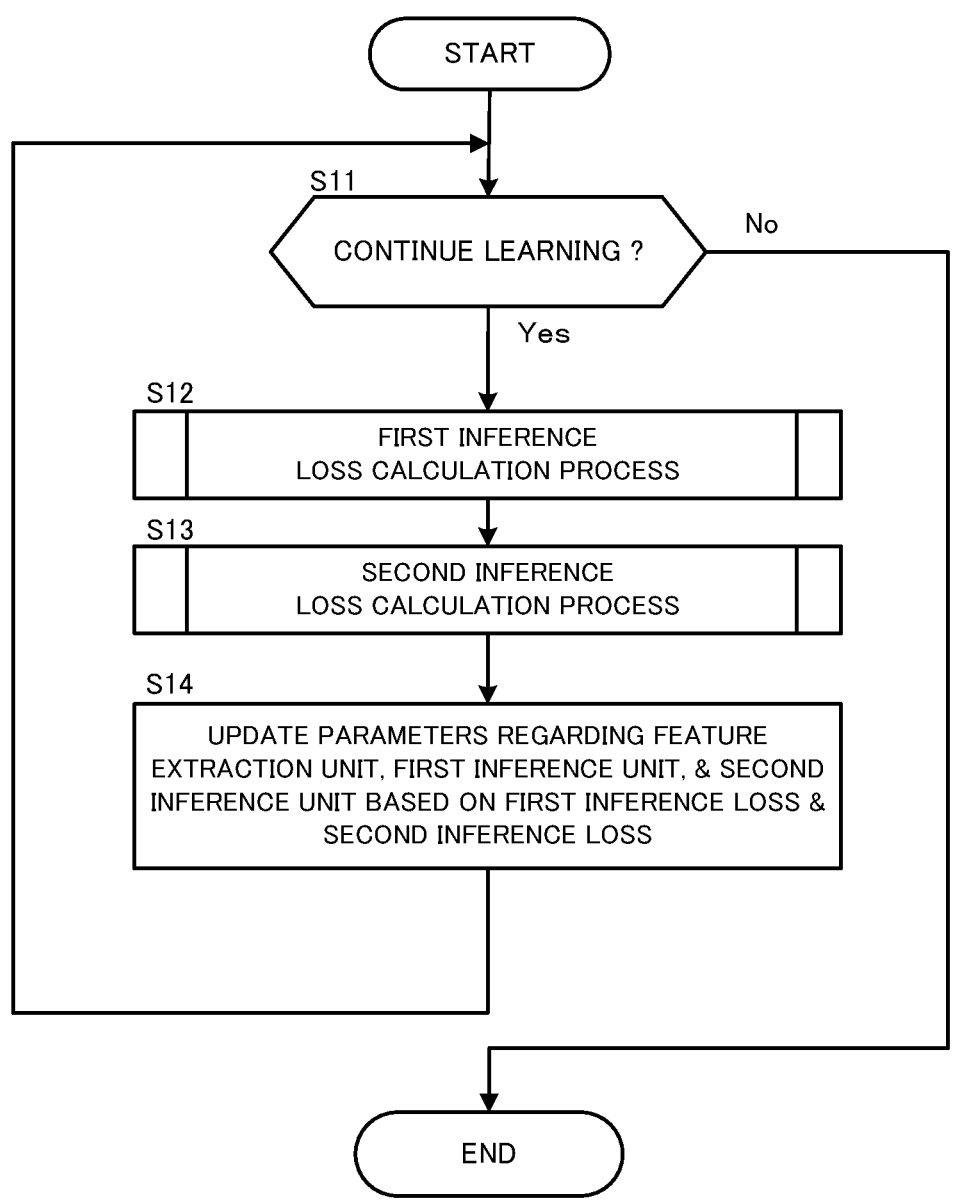
FIG. 6 is an example of a flowchart showing an outline of the learning process.

FIG. 6 is an example of a flowchart illustrating an outline of a learning process executed by the learning device 10.

First, the learning device 10 determines whether or not to continue the learning (step S11). When it is determined that the learning device 10 should continue the learning (step S11; Yes), the learning device 10 proceeds with the process at step S12. For example, when the learning device 10 detects a user input specifying the moving image data Dm and the still image data Ds to be used for the learning, or when there are moving image data Dm and still image data Ds already designated as the target training data but not used for the learning yet, it is determined that learning should be continued. On the other hand, when it is determined that the learning device 10 should not continue the learning (step S11; No), the learning device 10 ends the processing of the flowchart. The learning device 10 determines that the learning should not be continued when, for example, a user input or the like indicating that the learning should be terminated is detected, or when the learning using all the moving image data Dm and the still image data Ds designated as the target training data is completed.

Next, the feature extraction unit 31, the first inference unit 32, and the first inference loss calculation unit 33 of the learning device 10 execute the first inference loss calculation process that is a process of calculation the first inference loss Lm based on the moving image data Dm stored in the moving image data storage unit 21 (step S12). The first inference loss calculation process will be described later with reference to FIG. 7. Further, the feature extraction unit 31, the second inference unit 34, and the second inference loss calculation unit 35 of the learning device 10 execute the second inference loss calculation process that is a process of calculating the second inference loss Ls based on the still image data Ds stored in the still image data storage unit 22

(step S13). The second inference loss calculation process will be described later with reference to FIG. 8.

Next, the update unit 36 of the learning device 10 updates the parameters regarding the feature extraction unit 31, the first inference unit 32, and the second inference unit 34 based on the first inference loss Lm calculated at step S12 and the second inference loss Ls calculated at step S13 (step S14). In other words, the update unit 36 updates the parameters stored in the feature extraction unit information storage unit 25, the first inference unit information storage unit 26, and the second inference unit information storage unit 27, respectively. In this case, in the first example, the update unit 36 determines each parameter of the feature extraction unit 31, the first inference unit 32, and the second inference unit 34 so that the sum of the first inference loss Lm and the second inference loss Ls is minimized. In the second example, the update unit 36 independently executes: the process of determining each parameter of the feature extraction unit 31 and the first inference unit 32 so that the first inference loss Lm is minimized; and the processing of determining each parameter of the feature extraction unit 31 and the second inference unit 34 so that the second inference loss Ls is minimized.

Figure 7:
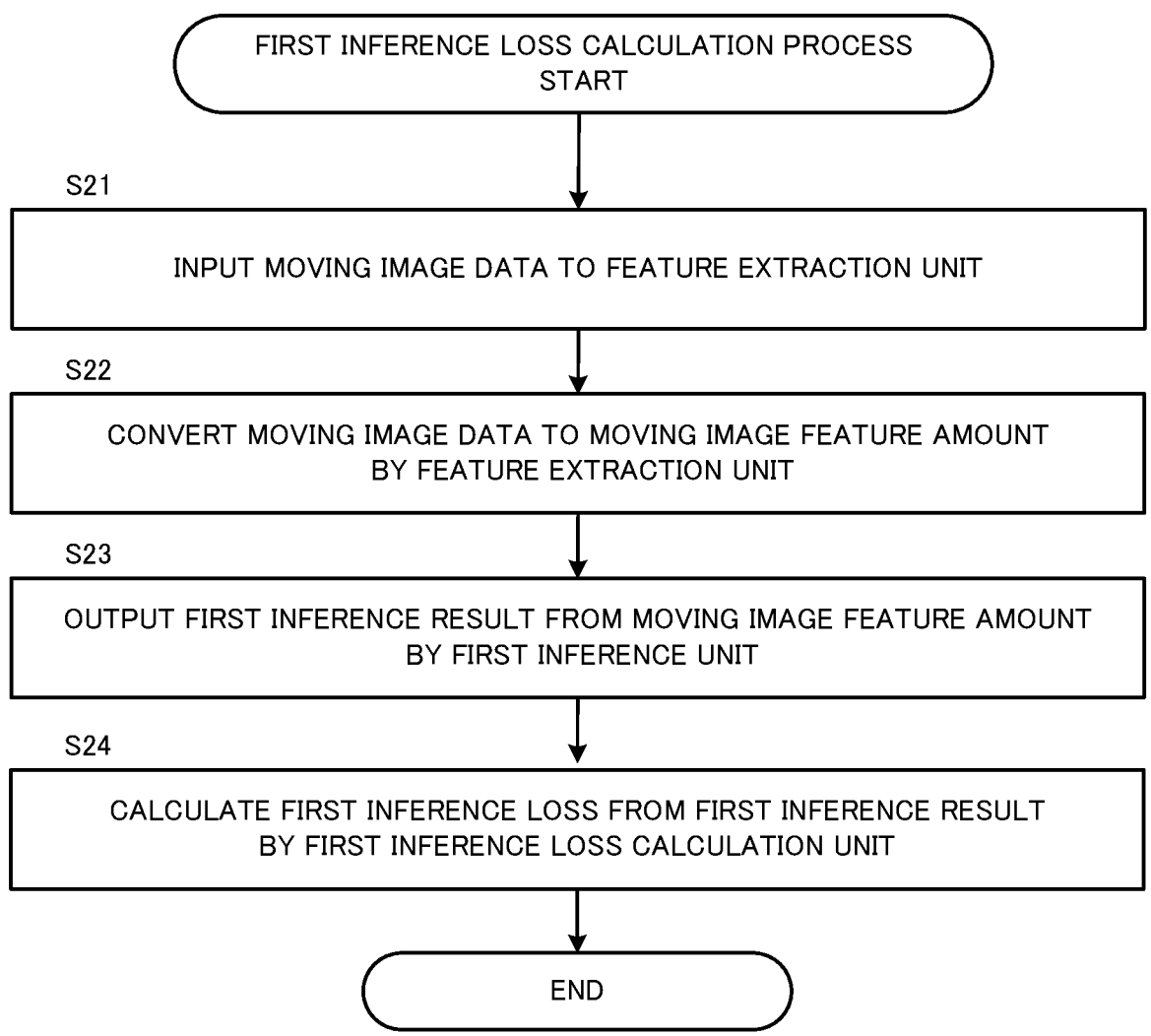
FIG. 7 is an example of a flowchart showing the procedure of a first inference loss calculation process.

FIG. 7 is an example of a flowchart illustrating a procedure of the first inference loss calculation processing performed by the learning device 10 at step S12 in FIG. 6.

First, the learning device 10 inputs the moving image data Dm stored in the moving image data storage unit 21 to the feature extraction unit 31 (step S21). When the storage device 20 is a server device or the like, the learning device 10 inputs the moving image data Dm received from the server device to the feature extraction unit 31.

Next, the feature extraction unit 31 of the learning device 10 converts the inputted moving image data Dm into the moving image feature amount Fm on the basis of the parameters stored in the feature extraction unit information storage unit 25 (step S22). Then, the first inference unit 32 of the learning device 10 outputs the first inference result Rm from the moving image feature amount Fm, which is outputted by the feature extraction unit 31, based on the parameters stored in the first inference unit information storage unit 26 (step S23). Then, the first inference loss calculation unit 33 of the learning device 10 calculates the first inference loss Lm based on the first inference result Rm outputted by the first inference unit 32 (step S24). In this case, for example, the first inference loss calculation unit 33 calculates the first inference loss Lm by using a predetermined loss function based on the first inference result Rm and the correct answer data which corresponds to the moving image data Dm inputted at step S21 and which is stored in the first correct answer data storage unit 23.

Figure 8:
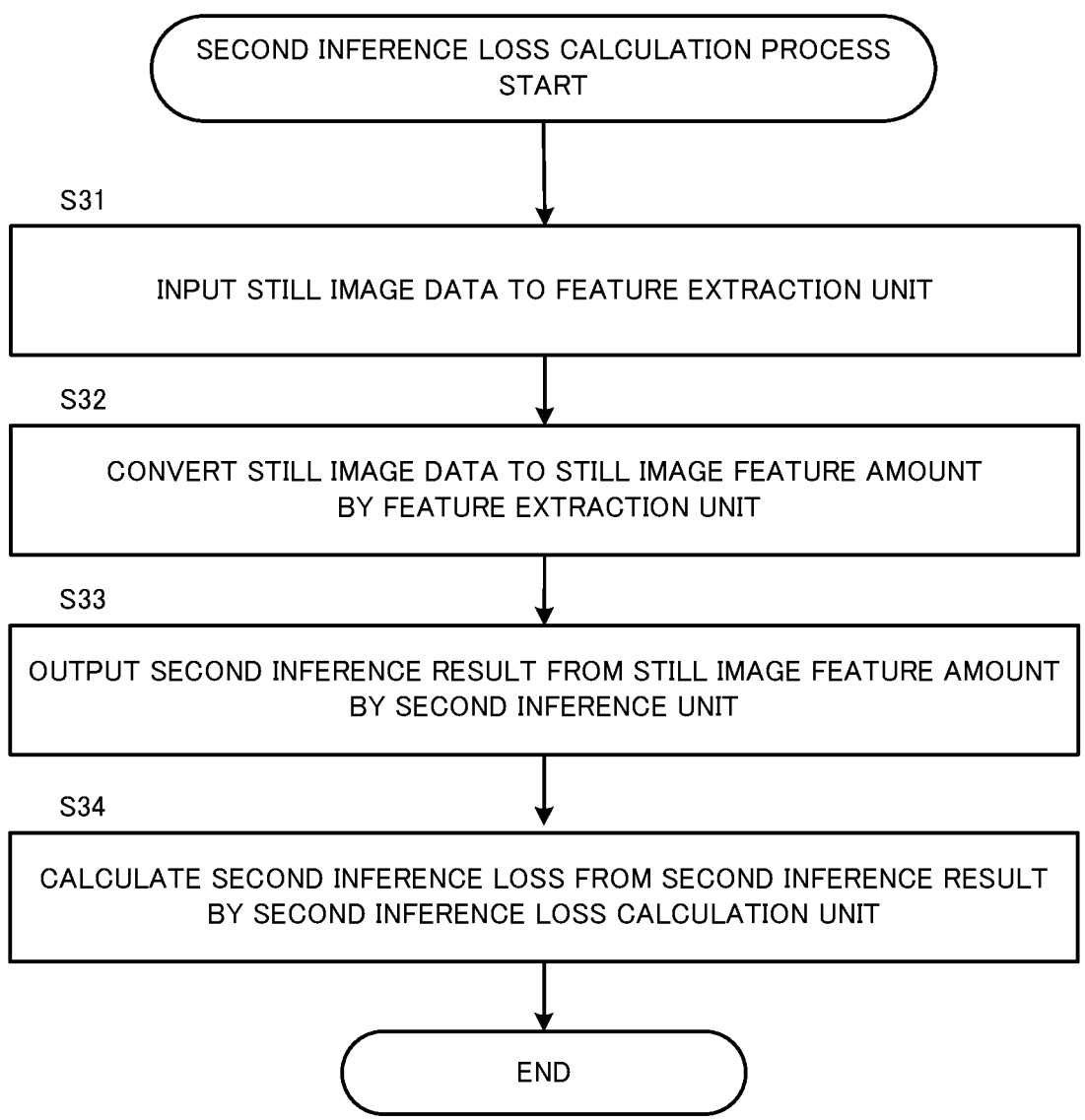
FIG. 8 is an example of a flowchart showing the procedure of a second inference loss calculation process.

FIG. 8 is an example of a flowchart showing the procedure of the second inference loss calculation processing executed by the learning device 10 at step S13 in FIG. 6.

First, the feature extraction unit 31 of the learning device 10 inputs the still image data Ds stored in the still image data storing unit 22 to the feature extraction unit 31 (step S31). When the storage device 20 is a server device or the like, the learning device 10 inputs the still image data Ds received from the server device to the feature extraction unit 31.

Next, the feature extraction unit 31 of the learning device 10 converts the input still image data Ds into the still image feature amount Fs on the basis of the parameters stored in the feature extraction unit information storage unit 25 (step S32). Then, the second inference unit 34 of the learning device 10 outputs the second inference result Rs from the still image feature amount Fs, which is outputted by the feature extraction unit 31, based on the parameters stored in the second inference unit information storage unit 27 (step S33). Then, the second inference loss calculation unit 35 of the learning device 10 calculates the second inference loss Ls based on the second inference result Rs outputted by the second inference unit 34 (step S34). In this case, the second inference loss calculation unit 35 calculates the second inference loss Ls by using a predetermined loss function based on the second inference result Rs and the correct answer data which corresponds to the still image data Ds inputted at step S31 and which is stored in the second correct answer data storage unit 24.

According to the flowchart in FIG. 6, the learning device 10 executes the first inference loss calculation processing earlier than the second inference loss calculation processing, but may execute the second inference loss calculation processing earlier than the first inference loss calculation processing. Further, the learning device 10 may execute, at independent timing, the processing by the update unit 36 based on the first inference loss Lm obtained by the first inference loss calculation processing and the processing by the update unit 36 based on the second inference loss Ls obtained by the second inference loss calculation processing, respectively.

Figure 9:
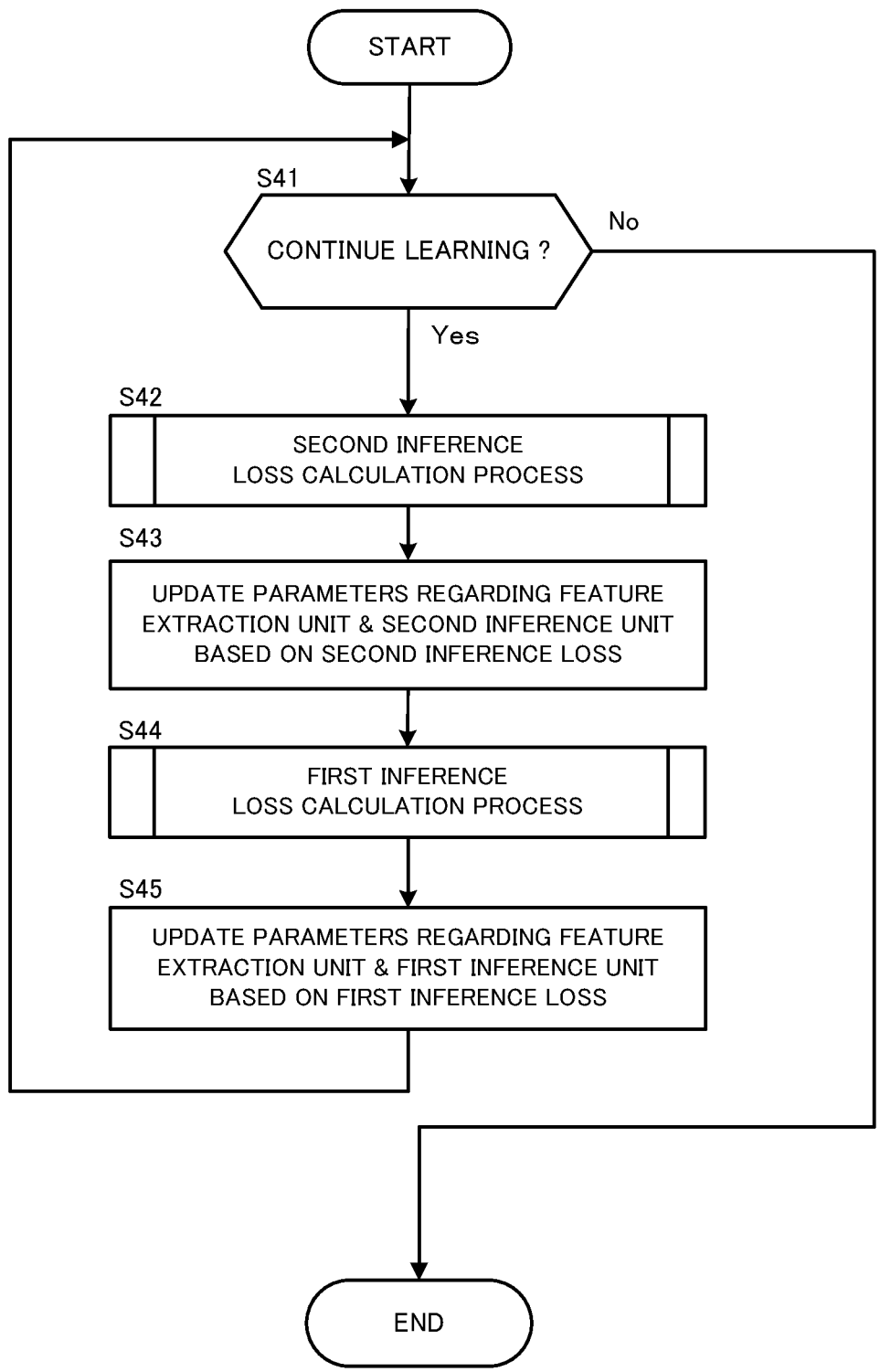
FIG. 9 is a modification of the flowchart showing an outline of the learning process.

FIG. 9 is a modification of a flowchart showing an outline of a learning process executed by the learning device 10. In the flowchart of FIG. 9, the learning device 10 executes the second inference loss calculation process ahead of the first inference loss calculation process and independently executes the update of the parameters based on the loss obtained by each of the processes immediately after each of the processes.

First, the learning device 10 determines whether or not to continue the learning (step S41). When it is determined that the learning device 10 should continue the learning (step S41; Yes), the learning device 10 executes the second inference loss calculation process (step S42). Then, the update unit 36 of the learning device 10 updates each parameter of the feature extraction unit 31 and the second inference unit 34 based on the second inference loss Ls obtained by the second inference loss calculation processing (step S43). In other words, the update unit 36 updates each parameter stored in the feature extraction unit information storage unit 25 and the second inference unit information storage unit 27.

Next, the learning device 10 executes the first inference loss calculation process (step S44). Then, the update unit 36 of the learning device 10 updates each parameter of the feature extraction unit 31 and the first inference unit 32 based on the first inference loss Lm obtained by the first inference loss calculation processing (step S45). In other words, the update unit 36 updates each parameter stored in the feature extraction unit information storage unit 25 and the first inference unit information storage unit 26.

(4) Applications

Next, specific examples in which the learning device 10 according to the present example embodiment is applied to a specific application will be described.

(4-1) Human Motion Identification

Figure 10:
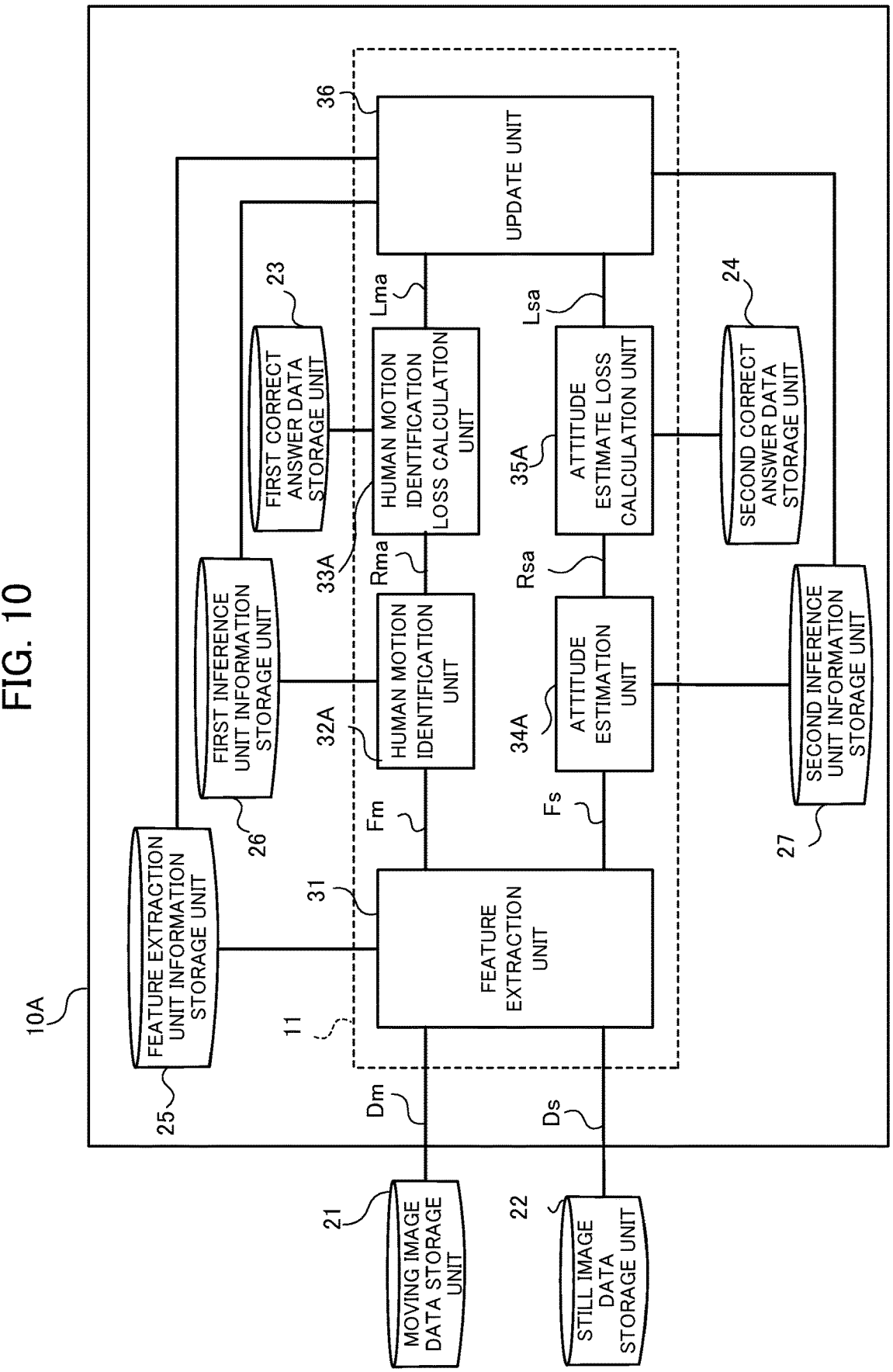
FIG. 10 illustrates a schematic diagram showing a functional configuration of the learning device for performing learning for human motion identification.

FIG. 10 is a schematic diagram illustrating a functional configuration of a learning device 10A that performs learning for identifying a human motion (operation).

The processor 11 of the learning device 10A includes a feature extraction unit 31, a human motion identification unit 32A, a human motion identification loss calculation unit 33A, an attitude estimation unit 34A, an attitude estimate loss calculation unit 35A, and an update unit 36. Further, the moving image data storage unit 21 and the first correct answer data storage unit 23 stores the moving image data Dm and its correct answer data that are the training data for human motion identification, respectively. The still image data storage unit 22 and the second correct answer data storage unit 24 stores the still image data Ds and its correct answer data that are the training data for attitude (posture) estimation, respectively.

The feature extraction unit 31 generates the moving image feature amount Fm from the inputted moving image data Dm and generates the still image feature amount Fs from the inputted still image data Ds. Then, the feature extraction unit 31 supplies the generated moving image feature amount Fm to the human motion identification unit 32A and supplies the generated still image feature amount Fs to the attitude estimation unit 34A. For example, the feature extraction unit 31 includes one or more feature conversion layers 40 (see FIG. 3). The feature conversion layer 40 has, for example, a configuration according to any of FIG. 4, FIG. 5A or FIG. 5B described above.

The human motion identification unit 32A corresponds to the first inference unit 32 in FIG. 2 and outputs the human motion identification result "Rma" based on the moving image feature amount Fm inputted from the feature extraction unit 31. For example, the human motion identification unit 32A outputs information indicating the probability for each human motion to be identified as the human motion identification result Rma. Here, the human motion identification unit 32A is a learning model learned to output the human motion identification result Rma based on the moving image feature amount Fm supplied from the feature extraction unit 31. Then, the first inference unit information storage unit 26 stores the information relating to the parameters required to configure the human motion identification unit 32A.

The human motion identification loss calculation unit 33A corresponds to the first inference loss calculation unit 33 in FIG. 2, and calculates the human motion identification loss "Lma", which is a loss with respect to the human motion identification result Rma, on the basis of the human motion identification result Rma and the correct answer data which corresponds the moving image data Dm and which is obtained from the first correct answer data storage unit 23. Then, the human motion identification loss calculation unit 33A supplies the human motion identification loss Lma to the update unit 36.

The attitude estimation unit 34A corresponds to the second inference unit 34 in FIG. 2, and performs the attitude estimation of a person on the basis of the still image feature amount Fs supplied from the feature extraction unit 31, and outputs the attitude estimation result "Rsa" of the attitude estimation. For example, the attitude estimation unit 34A outputs information indicating the probability for each attitude to be estimated as the attitude estimation result Rsa. Here, the attitude estimation unit 34A is a learning model learned to output the attitude estimation result Rsa on the basis of the still image feature amount Fs supplied from the feature extraction unit 31. The second inference unit information storage unit 27 stores information relating to parameters required to configure the attitude estimation unit 34A.

The attitude estimation loss calculation unit 35A corresponds to the second inference loss calculation unit 35 in FIG. 2, and calculates the attitude estimate loss "Lsa", that is a loss for the attitude estimation result Rsa, based on the attitude estimation result Rsa and the correct answer data which corresponds to the still image data Ds and which is obtained from the second correct answer data storage unit 24. Then, the attitude estimation loss calculation unit 35A supplies the calculated attitude estimate loss Lsa to the update unit 36.

The update unit 36 determines the respective parameters of the feature extraction unit 31, the human motion identification unit 32A, and the attitude estimation unit 34A based on the human motion identification loss Lma supplied from the human motion identification loss calculation unit 33A and the attitude estimate loss Lsa supplied from the attitude estimate loss calculation unit 35A. Then, the update unit 36 stores the determined parameters of each of the units in the feature extraction unit information storage unit 25, the first inference unit information storage unit 26, and the second inference unit information storage unit 27, respectively.

According to this application, the learning device 10A learns the attitude estimation, that needs to focus on the human area as well as the human motion identification, by using the still image data Ds while learning the human motion identification by using the moving image data Dm. Thus, even when the training data of the moving image is insufficient, the learning device 10A can suitably perform the learning of the feature extraction unit 31 for extracting the feature amount relating to the human area by using both the moving image data Dm and the still image data Ds.

(4-2) Human Action Detection

Figure 11:
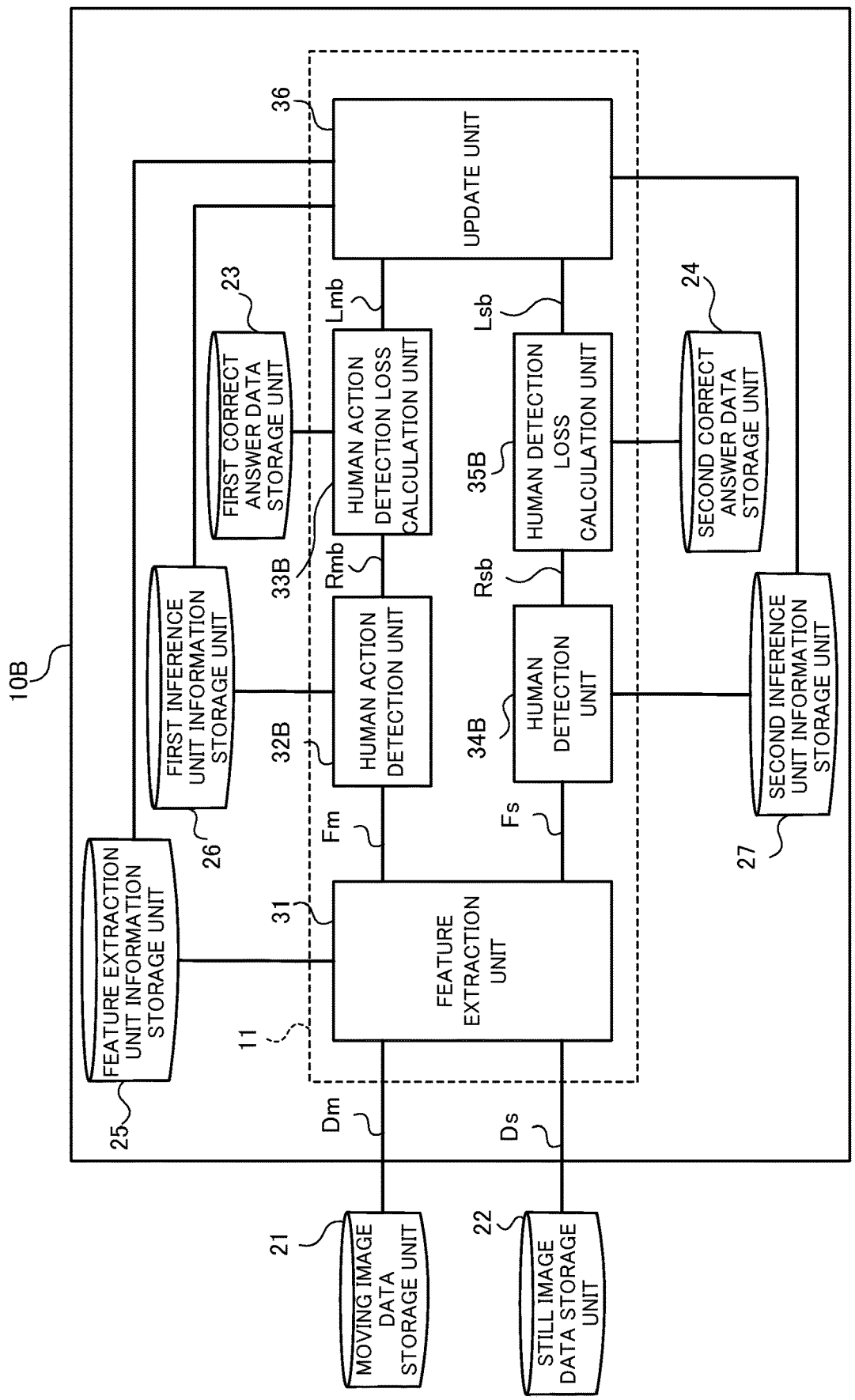
FIG. 11 illustrates a schematic diagram showing a functional configuration of the learning device for performing learning for human action detection.

FIG. 11 is a schematic diagram showing a functional configuration of a learning device 10B that performs learning for detecting human action.

The processor 11 of the learning device 10B includes a feature extraction unit 31, a human action detection unit 32B, a human action detection loss calculation unit 33B, a human detection unit 34B, a human detection loss calculation unit 35B, and an update unit 36. Further, the moving image data storage unit 21 and the first correct answer data storage unit 23 stores the moving image data Dm and its correct answer data that are training data for human action detection, respectively. The still image data storage unit 22 and the second correct answer data storage unit 24 stores the still image data Ds and its correct answer data that are training data for human detection, respectively.

The feature extraction unit 31 generates the moving image feature amount Fm from the inputted moving image data Dm and generates the still image feature amount Fs from the inputted still image data Ds. Then, the feature extraction unit 31 supplies the generated moving image feature amount Fm to the human action detection unit 32B and supplies the generated still image feature amount Fs to the human detection unit 34B. For example, the feature extraction unit 31 includes one or more feature conversion layers 40 (see FIG. 3). The feature conversion layer 40 has, for example, a configuration shown in any of FIG. 4, FIG. 5A, or FIG. 5B described above.

The human action detection unit 32B corresponds to the first inference unit 32 in FIG. 2 and outputs the human action detection result "Rmb" based on the moving image feature amount Fm inputted from the feature extraction unit 31. For example, the human action detection unit 32B outputs, as the human action detection result Rmb, information relating to the presence or absence of the detected human and the action thereof estimated when the detected human exists. Here, the human action detection unit 32B is a learning model that is learned to output the human action detection result Rmb based on the moving image feature amount Fm supplied from the feature extraction unit 31. The first inference unit information storage unit 26 stores information relating to parameters required to configure the human action detection unit 32B.

The human action detection loss calculation unit 33B corresponds to the first inference loss calculation unit 33 in FIG. 2, and calculates the human action detection loss "Lmb", which is a loss with respect to the human action detection result Rmb, on the basis of the human action detection result Rmb inputted from the human action detection unit 32B. Then, the human action detection loss calculation unit 33B supplies the human action detection loss Lmb to the update unit 36.

The human detection unit 34B corresponds to the second inference unit 34 in FIG. 2, and performs processing for detecting a person based on the still image feature amount Fs supplied from the feature extraction unit 31, and outputs the human detection result "Rsb" obtained by the processing. For example, the human action detection unit 32B outputs information relating to the presence or absence of a detected human as the human detection result Rsb. Here, the human detection unit 34B is a learning model learned to output the human detection result Rsb on the basis of the still image feature amount Fs supplied from the feature extraction unit 31. The second inference unit information storage unit 27 stores information relating to parameters required to configure the human detection unit 34B.

The human detection loss calculation unit 35B corresponds to the second inference loss calculation unit 35 in FIG. 2, and calculates the human detection loss "Lsb", which is a loss with respect to the human detection result Rsb, on the basis of the human detection result Rsb supplied from the human detection unit 34B and the correct answer data which corresponds to the still image data Ds and which is acquired from the second correct answer data storage unit 24. Then, the human detection loss calculation unit 35B supplies the calculated human detection loss Lsb to the update unit 36.

The update unit 36 determines the respective parameters of the feature extraction unit 31, the human action detection unit 32B, and the human detection unit 34B based on the human action detection loss Lmb supplied from the human action detection loss calculation unit 33B and the human detection loss Lsb supplied from the human detection loss calculation unit 35B. Then, the update unit 36 stores the determined parameters of each of the units in the feature extraction unit information storage unit 25, the first inference unit information storage unit 26, and the second inference unit information storage unit 27, respectively.

According to this application, the learning device 10B learns, by using the still image data Ds, the human detection that needs to focus on the human area as well as the human action detection while learning the human action detection by using the moving image data Dm. Thus, even when the training data regarding the moving image is insufficient, the learning device 10B can suitably perform the learning of the feature extraction unit 31 which extracts the feature amount relating to the human area by using both the moving image data Dm and the still image data Ds.

It is noted that, instead of the application examples illustrated in FIGS. 10 and 11, the learning device 10 may perform the learning of the feature extraction unit 31 by combining the inference using the moving image data Dm with any of various inferences using the still image data Ds. For example, the learning device 10 may apply any of various inferences, such as image classification processing and a semantic segmentation, to the still image data Ds in which the same type of object is captured as in the moving image data Dm.

Second Example Embodiment

Figure 12:
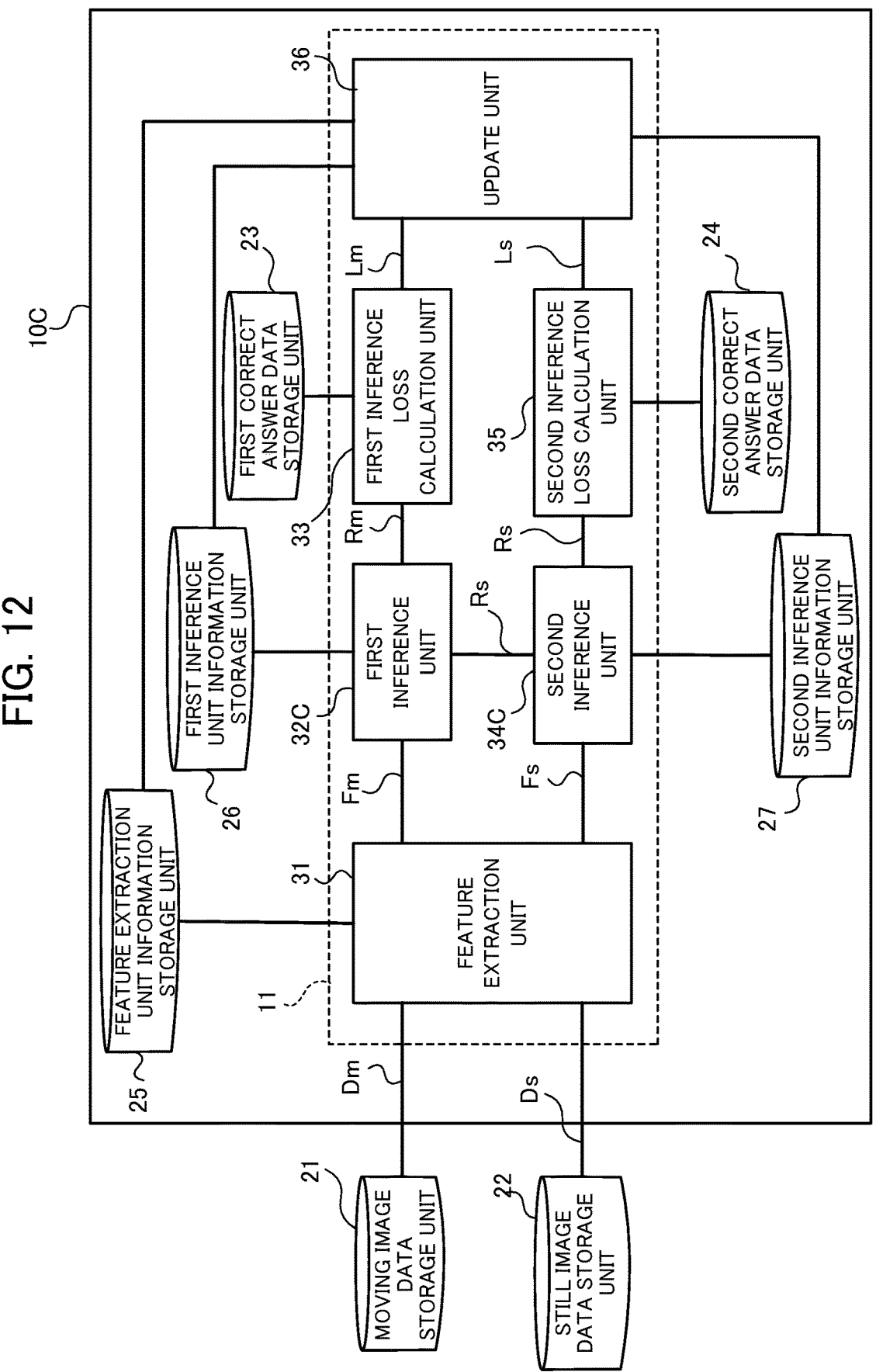
FIG. 12 illustrates a schematic diagram showing a functional configuration of the learning device relating to the learning process according to a second example embodiment.

FIG. 12 is a schematic diagram showing a functional configuration in the learning process of the learning device 10C according to the second example embodiment. The learning device 10C according to the second example embodiment differs from the learning device 10 according to the first example embodiment in that the processing result outputted by the second inference unit 34 for the still image data Ds is used for processing to be executed by the first inference unit 32. In the following, since the feature extraction unit 31, the first inference loss calculation unit 33, the second inference loss calculation unit 35, and the update unit 36 perform the same processings as those of the first example embodiment, the description thereof will be omitted.

The second inference unit 34C of the learning device 10C outputs the second inference result Rs based on the still image feature amount Fs extracted from the still image data Ds by the feature extraction unit 31 in the same way as the second inference unit 34 according to the first example embodiment in the learning using the still image data Ds. Then, the update unit 36 updates the respective parameters of the feature extraction unit 31 and the second inference unit 34C so as to minimize the second inference loss Ls calculated by the second inference loss calculation unit 35 based on the second inference result Rs.

On the other hand, in the learning using the moving image data Dm, the feature extraction unit 31 supplies the moving image feature amount Fm of the moving image data Dm to the first inference unit 32C and supplies the still image feature amount Fs, that is the feature amount of each image (frame) constituting the moving image data Dm, to the second inference unit 34C.

In this case, the second inference unit 34C calculates the second inference result Rs based on the still image feature amount Fs supplied from the feature extraction unit 31 and supplies the calculated second inference result Rs to the first inference unit 32C and to the second inference loss calculation unit 35, respectively. Further, the first inference unit 32C calculates the first inference result Rm based on the moving image feature amount Fm supplied from the feature extraction unit 31 and the second inference result Rs supplied from the second inference unit 34C. Then, the first inference unit 32C supplies the calculated first inference result Rm to the first inference loss calculation unit 33. Similarly, the second inference unit 34C calculates the second inference result Rs based on the still image feature amount Fs supplied from the feature extraction unit 31 and supplies the calculated second inference result Rs to the second inference loss calculation unit 35. Thereafter, the update unit 36 updates the respective parameters of the feature extraction unit 31, the first inference unit 32C, and the second inference unit 34C based on the first inference loss Lm, which the first inference loss calculation unit 33 calculates from the first inference result Rm, and the second inference loss Ls, which the second inference loss calculation unit 35 calculates from the second inference result Rs.

Here, a specific process of the first inference unit 32C will be described.

The first inference unit 32C integrates the second inference result Rs supplied from the second inference unit 34C into the moving image feature amount Fm supplied from the feature extraction unit 31, and outputs the first inference result Rm from the integrated moving image feature amount Fm that serves as the input. The first inference unit 32C is learned so as to accept the moving image feature amount Fm into which the second inference result Rs is integrated as an input and output the first inference result Rm.

In this case, in the first example, the second inference result Rs is a mask image indicating the classification of each region or each pixel in the image, and the first inference unit 32C expands (that is, increases the number of channels) the data length in the channel direction with respect to the moving image feature amount Fm for each image. Then, the first inference unit 32C stores, in the enlarged new channels of each image of the moving image feature amount Fm, the second inference result Rs generated based on the each image of the moving image feature amount Fm. For example, when the number of channels of the moving image feature amount Fm is "Ca" and the number of channels of the second inference result Rs is "Cb", the first inference unit 32C generates the moving image feature amount Fm in which the number of channels becomes "Ca+Cb" by integrating the second inference result Rs into the moving image feature amount Fm.

In the second example, when the second inference result Rs is a mask image that indicates an area of an object or a person to be an action detection target of the action image recognition, the first inference unit 32C performs mask processing on each image of the moving picture feature amount Fm using the second inference result Rs generated on the basis of the each image of the moving picture feature amount Fm. According to this example, the first inference unit 32C can suitably generate the moving image feature amount Fm based on the second inference result Rs without expanding the data length in the channel direction.

Figure 13:
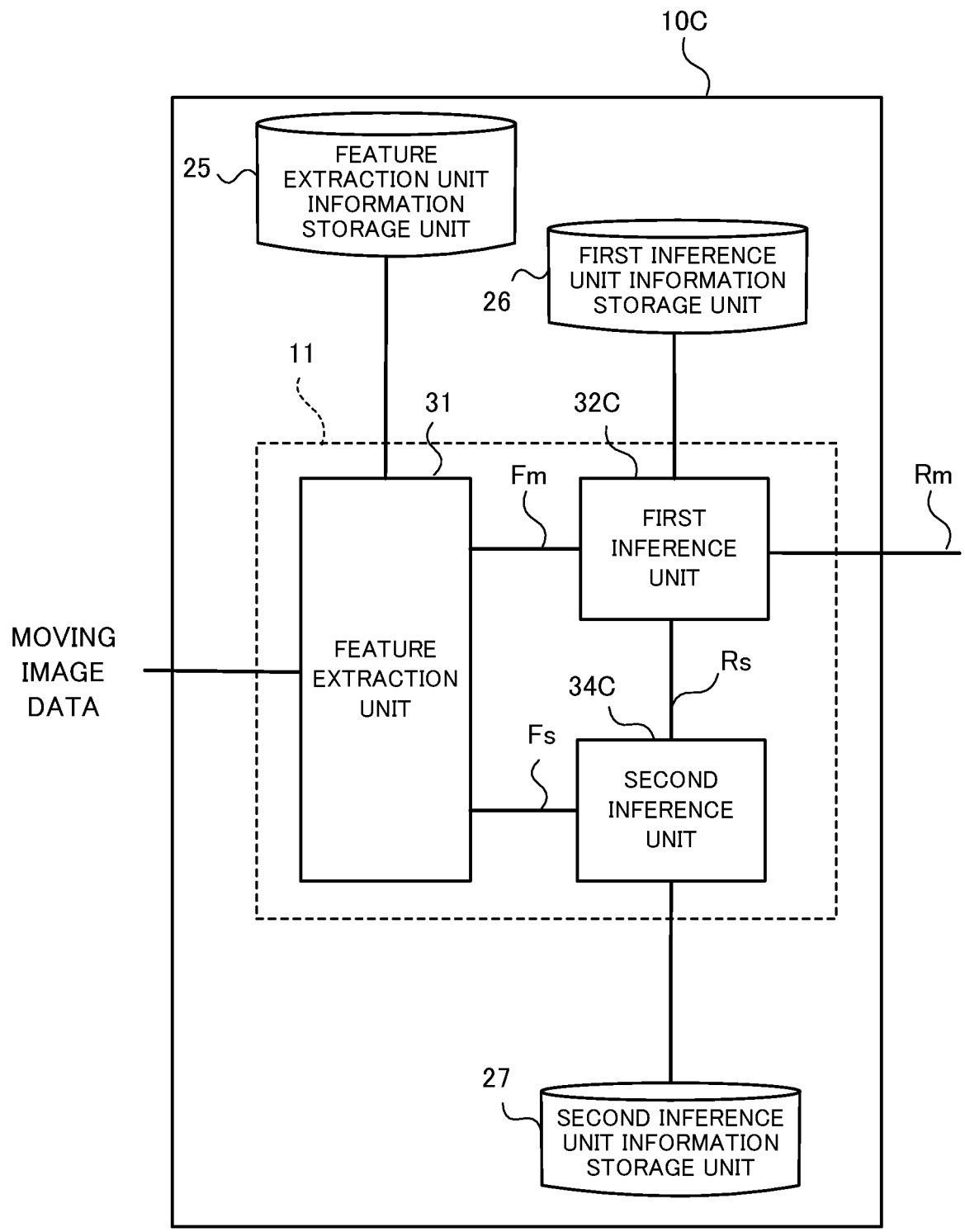
FIG. 13 illustrates a schematic diagram showing a functional configuration of the learning device relating to the inference processing according to the second example embodiment.

FIG. 13 is a schematic diagram showing a functional configuration in the inference process by the learning device 10C after the learning. In FIG. 13, only the components of the learning device 10C relating to the inference process are explicitly shown. The learned learning device 10C functions as an inference device.

In this case, the moving image data captured by the camera or the like is inputted to the feature extraction unit 31 via the interface 13. Then, the feature extraction unit 31 refers to the parameters of the feature extraction unit information storage unit 25 to extract the moving image feature amount Fm from the inputted moving image data while extracting the still image feature amount Fs from each image constituting the moving image feature amount Fm. Then, the feature extraction unit 31 supplies the extracted moving image feature amount Fm to the first inference unit 32C and supplies the extracted still image feature amount Fs to the second inference unit 34C. In this case, the second inference unit 34C calculates the second inference result Rs from the still image feature amount Fs based on the parameters stored in the second inference unit information storage unit 27 and supplies the calculated second inference result Rs to the first inference unit 32C. The first inference unit 32C calculates the first inference result Rm based on the moving image feature amount Fm supplied from the feature extraction unit 31 and the second inference result Rs supplied from the second inference unit 34C, and outputs the first inference result Rm.

Thus, the learning device 10C according to the second example embodiment can suitably improve the accuracy of the inference by the first inference unit 32 by using the inference result by the second inference unit 34C for the inference by the first inference unit 32. The learning device 10C according to the second example embodiment is suitably applied to both the application of the learning of the human motion identification and the attitude estimation shown in FIG. 10 and the application of the learning of the human action detection and the human detection shown in FIG. 11.

Figure 14:
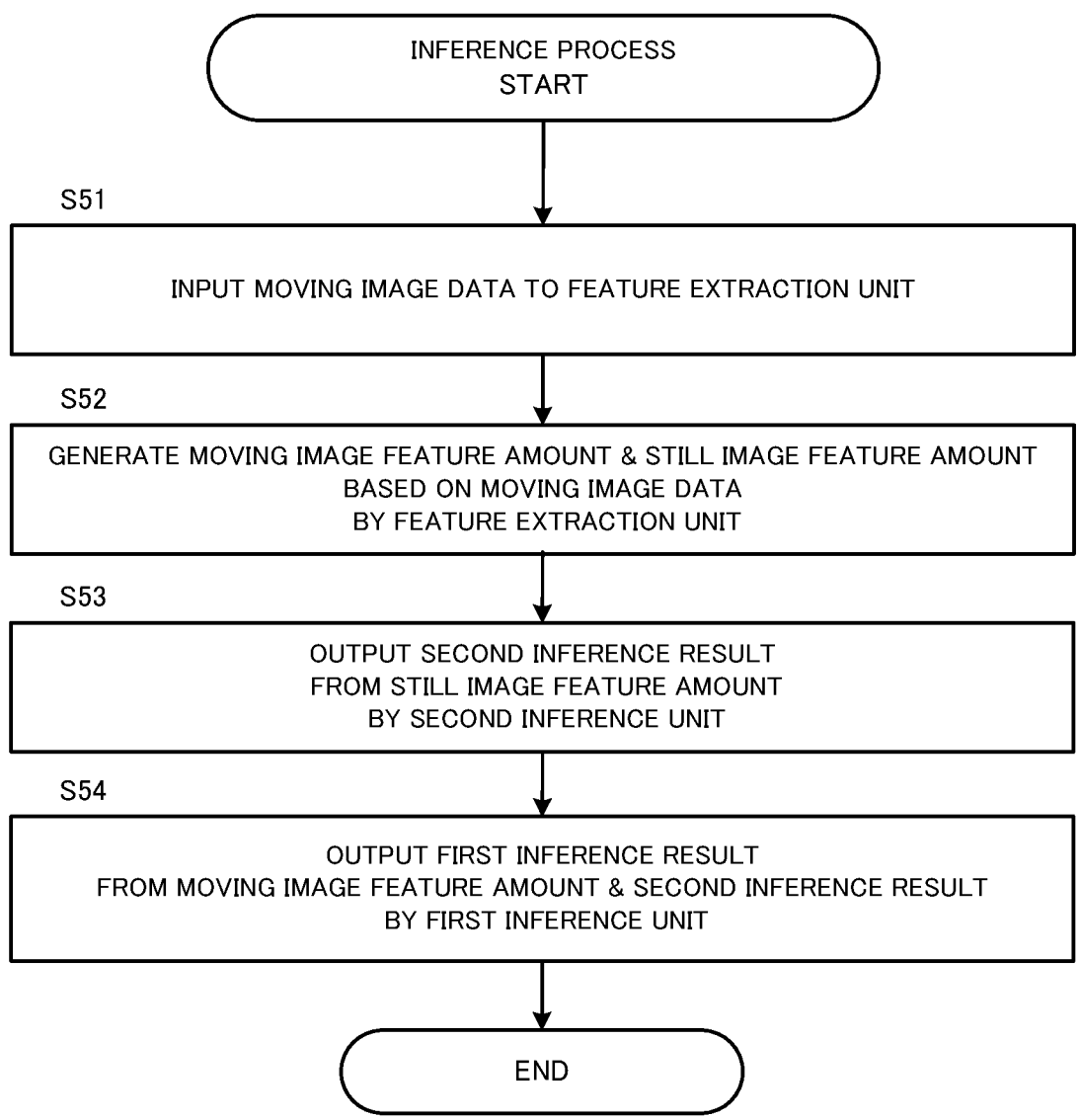
FIG. 14 is an example of a flowchart showing the procedure of an inference process.

FIG. 14 is a flow chart illustrating the procedure of the inference process executed by the learned learning device 10C.

First, the learning device 10C acquires the moving image data as a target of the inference process and inputs the moving image data to the feature extraction unit 31 (step S51). Then, the feature extraction unit 31 generates the moving image feature amount Fm and the still image feature amount Fs based on the inputted moving image data using the parameters stored in the feature extraction unit information storage unit 25 (step S52). In this case, the feature extraction unit 31 performs the same treatment as the processing on the still image data Ds for each image constituting the inputted moving image data, thereby generating the still image feature amount Fs corresponding to the each image.

Next, the second inference unit 34C outputs the second inference result Rs from the still image feature amount Fs using the parameters stored in the second inference unit information storage unit 27 (step S53). Then, the first inference unit 32C refers to the parameters stored in the first inference unit information storage unit 26 and outputs the first inference result Rm from the moving image feature amount Fm supplied from the feature extraction unit 31 and the second inference result Rs supplied from the second inference unit 34C (step S54). In this case, for example, the first inference unit 32C integrates the second inference result Rs of each image of the moving image data into the moving image feature amount Fm of the each image of the moving image data and thereby generates the moving image feature amount Fm in which the second inference result Rs is included. Then, on the basis of the generated moving image feature amount Fm, the first inference unit 32C outputs the first inference result Rm. Thereby, the first inference unit 32C can obtain the accurate inference result of the moving image in which the inference result by the second inference unit 34C that performs the inference per image is reflected.

Instead of outputting the first inference result Rm based on the moving image feature amount Fm outputted by the feature extraction unit 31 and the second inference result Rs outputted by the second inference unit 34C, the first inference unit 32C may output the first inference result Rm based on the moving image feature amount Fm and the still image feature amount Fs which are outputted by the feature extraction unit 31. In this case, the first inference unit 32C integrates the still image feature amount Fs supplied from the feature extraction unit 31 into the moving image feature amount Fm supplied from the feature extraction unit 31, and outputs the first inference result Rm from the integrated moving image feature amount Fm that serves as the input. In this case, when the number of channels of the moving image feature amount Fm (i.e., the data length in the channel direction) is "Ca" and the number of channels of the still image feature amount Fs is "Cc", the first inference unit 32C generates the moving image feature amount Fm in which the number of channels becomes "Ca+Cc" by integrating the still image feature amount Fs into the moving image feature amount Fm. Then, the first inference unit 32C is learned to output the first inference result Rm when the moving image feature amount Fm into which the still image feature amount Fs is integrated is inputted to the first inference unit 32C.

Third Example Embodiment

Figure 15:
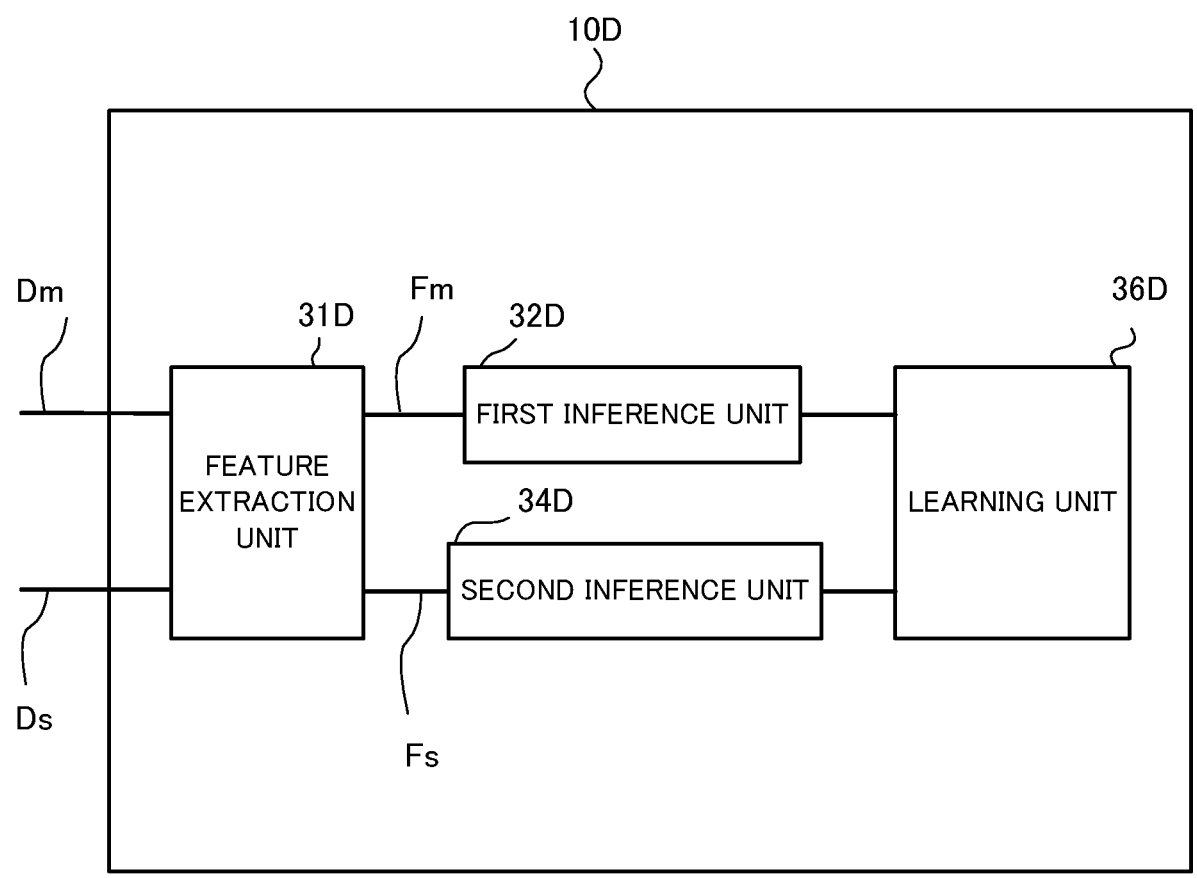
FIG. 15 illustrates a schematic configuration of a learning device according to a third example embodiment.

FIG. 15 shows a schematic configuration of a learning device 10D according to a third example embodiment. The learning device 10D includes a feature extraction unit 31D, a first inference unit 32D, a second inference unit 34D, and a learning unit 36D.

The feature extraction unit 31D of the learning device 10D is learned to extract moving image feature amount Fm which is feature amount relating to the moving image data Dm when the moving image data Dm is inputted thereto, and is learned to extract still image feature amount Fs which is feature amount relating to the still image data Ds when the still image data Ds is inputted thereto. The first inference unit 32D performs a first inference regarding the moving image data Dm based on the moving image feature amount Fm. The second inference unit 34D performs a second inference regarding the still image data Ds based on the still image feature amount Fs. The learning unit 36D performs learning of the feature extraction unit 31D based on the results of the first inference and the second inference. For example, the learning unit 36D is configured by the first inference loss calculation unit 33, a second inference loss calculation unit 35, and an update unit 36 illustrated in FIG. 2 or FIG. 12.

By learning the feature extraction unit 31D using the still image data Ds in addition to the moving image data Dm, the learning device 10D according to the third example embodiment can suitably learn the feature extraction unit 31D that extracts the feature amount suitable for the inference regarding the moving image data.

The whole or a part of the example embodiments described above (including modifications, the same applies hereinafter) can be described as, but not limited to, the following Supplementary Notes.

[Supplementary Note 1]

A learning device comprising:
 a feature extraction unit configured to be learned
  to extract moving image feature amount which is feature amount relating to moving image data when the moving image data is inputted thereto, and
  to extract still image feature amount which is feature amount relating to still image data when the still image data is inputted thereto;
 a first inference unit configured to perform a first inference regarding the moving image data based on the moving image feature amount;
 a second inference unit configured to perform a second inference regarding the still image data based on the still image feature amount; and
 a learning unit configured to perform learning of the feature extraction unit based on results of the first inference and the second inference.

[Supplementary Note 2]

The learning device according to Supplementary Note 1,
wherein the feature extraction unit extracts the still image feature amount by using a parameter which is also used for the extraction of the moving image feature amount, and
wherein the learning unit update the parameter based on the results of the first inference and the second inference.

[Supplementary Note 3]

The learning device according to Supplementary Note 1 or 2,
wherein the feature extraction unit includes:
 an image feature conversion block configured to perform a feature conversion per image, the feature conversion being applied to the moving image data or feature amount of the moving image data, and to the still image data or feature amount of the still image data;
 a time series feature conversion block configured to perform a feature conversion relating to a time series, the feature conversion being applied to the moving image data or the feature amount of the moving image data; and
 a point feature conversion block configured to perform a feature conversion per point of an image, the feature conversion being applied at least to the still image data or the feature amount of the still image data.

[Supplementary Note 4]

The learning device according to Supplementary Note 3,
wherein the feature extraction unit includes a layer structure in which layers, each of which includes the image feature conversion block, the image feature conversion block, and the point feature conversion block, are stacked.

[Supplementary Note 5]

The learning device according to Supplementary Note 3 or 4,
wherein the time series feature conversion block converts the feature amount of the moving image data in a time series direction and in a channel direction, and
wherein the point feature conversion block converts the feature amount of the still image data so that the number of channels of the converted feature amount of the still image data is the same as the feature amount of the moving image data converted by the time series feature conversion block.

[Supplementary Note 6]

The learning device according to any one of Supplementary Notes 1 to 5,
wherein the learning unit includes:
 a first inference loss calculation unit configured to calculate a first inference loss for the first inference based on the result of the first inference and correct answer data corresponding to the first inference;
 a second inference loss calculation unit configured to calculate a second inference loss for the second inference based on the result of the second inference and correct answer data corresponding to the second inference; and
 an update unit configured to update the parameter of the feature extraction unit based on the first inference loss and the second inference loss.

[Supplementary Note 7]

The learning device according to any one of Supplementary Notes 1 to 6,
wherein the feature extraction unit extracts, as the still image feature amount, feature amount relating to an object which appears in both the moving image data and the still image data.

[Supplementary Note 8]

The learning device according to any one of Supplementary Notes 1 to 7,
wherein the learning unit performs the learning of the first inference unit based on the result of the first inference and correct answer data corresponding to the moving image data, and
wherein the learning unit performs the learning of the second inference unit based on the result of the second inference and correct answer data corresponding to the still image data.

[Supplementary Note 9]
An inference device comprising:
a feature extraction unit learned by a learning device according to any one of Supplementary Notes 1 to 8; and
a first inference unit configured to perform a first inference regarding inputted moving image data.

[Supplementary Note 10]
The learning device according to any one of Supplementary Notes 1 to 8,
wherein the first inference unit performs the first inference based on the moving image feature amount and information relating to the second inference.

[Supplementary Note 11]
An inference device comprising:
a feature extraction unit configured to be learned by a learning device according to Supplementary Note 10;
a first inference unit configured to perform a first inference regarding inputted moving image data; and
a second inference unit configured to perform a second inference regarding still image data based on still image feature amount which the feature extraction unit extracts from the still image data, the still image data being included in the moving image data, and
wherein the first inference unit performs the first inference based on the result of the second inference and moving image feature amount which the feature extraction unit extracts from the moving image data.

[Supplementary Note 12]
A control method executed by a learning device, the control method comprising:
performing extraction of moving image feature amount which is feature amount relating to moving image data when the moving image data is inputted, and extraction of still image feature amount which is feature amount relating to still image data when the still image data is inputted;
performing a first inference regarding the moving image data based on the moving image feature amount;
performing a second inference regarding the still image data based on the still image feature amount; and
performing learning of process of the extraction of the moving image feature amount and the extraction of the moving image feature amount based on results of the first inference and the second inference.

[Supplementary Note 13]
A storage medium storing a program executed by a computer, the program causing the computer to function as:
a feature extraction unit configured to be learned
to extract moving image feature amount which is feature amount relating to moving image data when the moving image data is inputted thereto, and
to extract still image feature amount which is feature amount relating to still image data when the still image data is inputted thereto;
a first inference unit configured to perform a first inference regarding the moving image data based on the moving image feature amount;
a second inference unit configured to perform a second inference regarding the still image data based on the still image feature amount; and
a learning unit configured to perform learning of the feature extraction unit based on results of the first inference and the second inference.

While the invention has been particularly shown and described with reference to example embodiments thereof, the invention is not limited to these embodiments. It will be understood by those of ordinary skilled in the art that various changes in form and details may be made therein without departing from the spirit and scope of the present invention as defined by the claims. In other words, it is needless to say that the present invention includes various modifications that could be made by a person skilled in the art according to the entire disclosure including the scope of the claims, and the technical philosophy. All Patent Literatures mentioned in this specification are incorporated by reference in its entirety.

DESCRIPTION OF REFERENCE NUMERALS 10, 10A to 10D Learning device
11 Processor
12 Memory
13 Interface
20 Storage device
21 Moving image data storage unit
22 Still image data storage unit
23 First correct answer data storage unit
24 Second correct answer data storage unit
25 Feature extraction unit information storage unit
26 First inference unit information storage unit
27 Second inference unit information storage unit
100 Learning system

What is claimed is:
1. A learning device comprising:
a processor; and
a memory storing instructions executable by the processor to:
extract a moving image feature amount from moving image data and a still image feature amount from still image data by inputting the moving image data and the still image data into a feature extraction model that is configured to extract the moving image feature amount and the still image feature image when provided with the moving image data and the still image data;
perform a first inference regarding the moving image data based on the moving image feature amount;
perform a second inference regarding the still image data based on the still image feature amount; and
perform updated learning of the feature extraction model based on results of the first inference and the second inference.

2. The learning device according to claim 1,
wherein the feature extraction model extracts the still image feature amount by using a parameter that the feature extraction model also used to extract the moving image feature amount, and
wherein the instructions are executable by the processor to further update the parameter based on the results of the first inference and the second inference.

3. The learning device according to claim 1,
wherein the feature extraction model includes:
an image feature conversion block configured to perform an image-based feature conversion, the image-based feature conversion being applied to the moving image data or a feature amount of the moving image data, and to the still image data or to a feature amount of the still image data;
a time series feature conversion block configured to perform a time series-based feature conversion, the time series-based feature conversion being applied to the moving image data or to the feature amount of the moving image data; and a point feature conversion block configured to perform an image point-based feature conversion, the image point-based feature conversion being applied at least to the still image data or to the feature amount of the still image data.

4. The learning device according to claim 3, wherein the feature extraction model includes a layer structure in which layers, each of which includes the image feature conversion block, the time series feature conversion block, and the point feature conversion block, are stacked.

5. The learning device according to claim 3, wherein the time series feature conversion block converts the feature amount of the moving image data in a time series direction and in a channel direction, and wherein the point feature conversion block converts the feature amount of the still image data so that a number of channels of the converted feature amount of the still image data is the same as the feature amount of the moving image data converted by the time series feature conversion block.

6. The learning device according to claim 2, wherein the program code is executable by the processor to further:

calculate a first inference loss for the first inference based on the result of the first inference and correct answer data corresponding to the first inference;

calculate a second inference loss for the second inference based on the result of the second inference and correct answer data corresponding to the second inference; and update the parameter of the feature extraction model based on the first inference loss and the second inference loss.

7. The learning device according to claim 1, wherein the feature extraction model extracts, as the still image feature amount, a feature amount relating to an object that appears in both the moving image data and the still image data.

8. The learning device according to claim 1, wherein the processor performs the updated learning of a first inference model that performs the first inference, based on the result of the first inference and correct answer data corresponding to the moving image data, and wherein the processor performs the updated learning of a second inference model that performs the second inference, based on the result of the second inference and correct answer data corresponding to the still image data.

9. The learning device according to claim 1, wherein the processor performs the first inference based on the moving image feature amount and information relating to the second inference.

10. A control method executed by a learning device, the control method comprising:

performing extraction of a moving image feature amount from moving image data and a still image feature amount from still image data by inputting the moving image data and the still image data into a feature extraction model that is configured to extract the moving image feature amount and the still image feature image when provided with the moving image data and the still image data;

performing a first inference regarding the moving image data based on the moving image feature amount;

performing a second inference regarding the still image data based on the still image feature amount; and performing updating learning of the feature extraction model based on results of the first inference and the second inference.

\* \* \* \* \*